United States Patent
Black et al.

(10) Patent No.: US 11,808,603 B2
(45) Date of Patent: Nov. 7, 2023

(54) DETERMINING ITEM LOCATIONS USING CROWDSOURCED DATA

(71) Applicant: Target Brands, Inc., Minneapolis, MN (US)

(72) Inventors: Clayton Black, Minneapolis, MN (US); Aaron Decker, Minneapolis, MN (US); Eric Runquist, Minneapolis, MN (US); Ben Podoll, Minneapolis, MN (US); Randy Carlson, Minneapolis, MN (US); Joakim Sternberg, Minneapolis, MN (US); Chelsea Kane, Minneapolis, MN (US); Debbie Bell, Minneapolis, MN (US); Michael Lissick, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 7 days.

(21) Appl. No.: 16/582,580

(22) Filed: Sep. 25, 2019

(65) Prior Publication Data
US 2020/0096349 A1 Mar. 26, 2020

Related U.S. Application Data

(60) Provisional application No. 62/735,894, filed on Sep. 25, 2018.

(51) Int. Cl.
*G01C 21/00* (2006.01)
*G01C 21/36* (2006.01)
*G06Q 30/0601* (2023.01)

(52) U.S. Cl.
CPC ....... *G01C 21/3841* (2020.08); *G01C 21/367* (2013.01); *G01C 21/3644* (2013.01);
(Continued)

(58) Field of Classification Search
None
See application file for complete search history.

(56) References Cited

U.S. PATENT DOCUMENTS 9,582,826 B2 2/2017 Calman et al.
2005/0021561 A1* 1/2005 Noonan ................. G06Q 30/06
(Continued)

FOREIGN PATENT DOCUMENTS

FR 3054060 A1 * 1/2018

OTHER PUBLICATIONS

Millon, Louis, "Translation of FR 3054060 A1", Jan. 18, 2018 (Year: 2018).*
(Continued)

*Primary Examiner* — Rachid Bendidi
*Assistant Examiner* — Selena M Jin
(74) *Attorney, Agent, or Firm* — Barnes & Thornburg LLP

(57) ABSTRACT

In some implementations, a method performed by data processing apparatuses includes receiving, from a requestor device, an item location request for an item. Map information is received for a mapped space in which the item is located. Item location coordinates are received corresponding to locations within the mapped space at which the item has been previously selected or scanned. The item location coordinates are mapped with respect to the mapped space, and a plurality of clusters are determined for the item location coordinates. For each cluster, a representative location of the cluster is determined. One of the clusters is selected, based at least in part on its representative location, and an estimated location of the item is provided to the requestor device, based at least in part on the representative location of the selected cluster.

24 Claims, 12 Drawing Sheets

(52) U.S. Cl.
CPC ....... *G01C 21/3679* (2013.01); *G01C 21/383* (2020.08); *G01C 21/3896* (2020.08); *G06Q 30/0643* (2013.01)

(56) References Cited

U.S. PATENT DOCUMENTS

| | | | | |
|---|---|---|---|---|
| 2012/0108259 | A1* | 5/2012 | Weiss | G06Q 30/0267 455/456.1 |
| 2014/0129378 | A1 | 5/2014 | Richardson | |
| 2014/0304123 | A1* | 10/2014 | Schwartz | G06Q 10/087 705/28 |
| 2014/0347492 | A1 | 11/2014 | Fales | |
| 2015/0006279 | A1* | 1/2015 | Khann | G06Q 30/0246 705/14.45 |
| 2015/0088937 | A1* | 3/2015 | Lons | G09B 29/003 707/803 |
| 2015/0262120 | A1* | 9/2015 | Kulig | G06Q 30/0639 705/28 |
| 2016/0231121 | A1 | 8/2016 | Young et al. | |
| 2016/0234652 | A1 | 8/2016 | Chao et al. | |
| 2018/0005309 | A1* | 1/2018 | Croy | G06Q 30/0639 |
| 2018/0293543 | A1* | 10/2018 | Tiwari | G05D 1/0274 |
| 2019/0005569 | A1* | 1/2019 | Kotha | G06F 16/29 |

OTHER PUBLICATIONS

Translation of FR-3054060-A1 (Year: 2018).*
Aisle411.com [online], "Aisle411: the power of indoor navigation & augmented reality," [retrieved Feb. 2, 2018], retrieved from: URL <http://aisle411.com/>.
Gizmodo.com [online] "This Segway-Based Robot Inventories an Entire Store in Less Than an Hour," Apr. 18, 2016, [retrieved Sep. 25, 2019], retrieved from: URL <https://gizmodo.com/this-segway-based-robot-inventories-an-entire-store-in-1771723686>.
Hardis-Group.com [online], "Eyesee: the drone allowing to automate inventory in warehouses,"[retrieved Feb. 2, 2018], retrieved from: URL <https://www.hardis-group.com/en/our-activities/logistics-solutions/eyesee-drone-allowing-automate-inventory-warehouses>.
PointInside, "Indoor Mapping and the Retail Store," 3 pages.
PointInside.com [online], "Boost Operational Efficiency," [retrieved Feb. 2, 2018], retrieved from: URL <https://www.pointinside.com/boost-operational-efficiency/>.
Song et al., "A cost effective material tracking and locating solution for material laydown yard," Procedia Engineering 123, Jan. 2015, 538-545.

* cited by examiner

DETERMINING ITEM LOCATIONS USING CROWDSOURCED DATA

CROSS-REFERENCE TO RELATED APPLICATIONS

This application claims priority to U.S. application Ser. No. 62/735,894, filed on Sep. 25, 2018. The disclosure of the prior application is considered part of the disclosure of this application, and is incorporated in its entirety into this application.

TECHNICAL FIELD

This specification generally relates to generating digital maps of physical spaces and locating items within the mapped spaces, such as generating digital maps and item identifiers within retail stores.

BACKGROUND

Digital maps of indoor and outdoor spaces have been used to help guide users as they move around those spaces. For example, digital maps have been generated and presented in applications that permit a user to zoom and scroll around the map, and in some instances, to view the user's current location superimposed at an appropriate location on the map. Items other than a user's current location can also be depicted on maps, such as presenting icons that identify places of interest for a user, such as stores, restaurants, and parks.

Organizations may collect item location data using various techniques. For example, when determining product inventory in a store or warehouse, employees can use barcode scanning devices to scan product codes and fixed location codes for locations at which products are found. A database management system can track product locations, and the system can be queried to identify the location of a product. Other techniques for identifying the location of a product in a store or warehouse may include vision-based techniques (e.g., using cameras), or radio-based techniques (e.g. using radio-frequency identification (RFID) tags affixed to products).

SUMMARY

This document generally describes computer systems, processes, program products, and devices for determining an estimated location of an item within a mapped space using crowdsourced data. For example, there can be several challenges to accurately determining the location of products within a retail store, such as products being physically moved within the store (e.g., moved to a different location than specified on the store's planogram), stores being physically reconfigured (e.g., store aisles being moved/reconfigured, movable racks being rearranged), and/or other physical changes that may not be fed back into the data backend. The disclosed technology can provide techniques for more accurately determining the current location of items within a mapped space (e.g., a retail store) through the use of crowdsourced data, which can then permit for those items to be more accurately identified in the mapped space to help guide users to the appropriate locations for the items.

For example, one or more different crowdsourced data signals that correlate an item to a physical location, such as the location within a retail store where a product is scanned, can be used to more accurately determine the products location. However, not all crowdsourced data is a reliable indicator of item location. For example, a user scanning a product at the location where the user picks the item off of a shelf in a retail store can be an accurate indicator of the product's location, but another user who scans the product after walking around the store for a while may provide an inaccurate location for the product. As a result, crowdsourced data itself can pose challenges to determining item location. The disclosed technology includes several techniques for differentiating between accurate and inaccurate crowdsourced data so that the determined item location is derived from the accurate location indicators in the crowdsourced data.

Sometimes, crowdsourced data may not be sufficiently accurate for determining item locations. For example, not enough scan data may exist for some products, such that the product's location may be indeterminate when using the crowdsourced data. As another example, a store may undergo a reorganization or remodel which may cause various inaccuracies. Rather than wait for sufficient crowdsourced data to accumulate over time, for example, focused work tasks can be provided to employees to collect reliable location data for products. The disclosed technology includes several techniques for identifying and fixing item location data inconsistencies.

In some implementations, a method performed by data processing apparatuses includes receiving, from a requestor device, an item location request for an item; receiving map information for a mapped space in which the item is located; receiving item location coordinates corresponding to locations within the mapped space at which the item has been previously selected or scanned using various different data collection devices over time; mapping the item location coordinates with respect to the mapped space; determining a plurality of clusters for the item location coordinates, based on the mapping; determining, for each cluster of the plurality of clusters, a representative location of the cluster; selecting one of the clusters, based at least in part on its representative location; and providing, to the requestor device, an estimated location of the item, based at least in part on the representative location of the selected cluster.

Other implementations of this aspect include corresponding computer systems, and include corresponding apparatus and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other implementations can include any, all, or none of the following features. The item location request can include location information that corresponds to a current location of the requestor device, and map information can be received for the mapped space that corresponds to the current location. The requestor device can present an item selection interface for indicating the item for which location information is to be provided. The requestor device can present a feedback interface for providing feedback with respect to whether the estimated location of the item is an accurate location of the item within the mapped space. Item information can be received for the item, the item information including item planogram information that indicates an assigned location for the item within the mapped space, and item taxonomy information that indicates a classification of the item within a classification hierarchy. A determination that a number of item location coordinates does not meet a threshold value can be performed, and supplemental item location coordinates can be received corresponding to locations within the mapped space at which items that share one or more classification levels with the item have been previously selected or scanned. The estimated location of the item can be selected, including selecting from among the representative location of the selected cluster and the assigned location for the item within the mapped space. Selecting one of the clusters can include selecting a cluster that has a representative location that is located within an area that corresponds to the assigned location for the item within the mapped space, based on its item planogram information. Selecting one of the clusters can include eliminating at least one cluster, the at least one eliminated cluster having a representative location that is located within a predefined area of the mapped space that is designated as an area that excludes item locations. Item information that includes the representative location of the selected cluster can be maintained in a cache. A subsequent location request for the item can be received from a second requestor device. The estimated location of the item can be provided to the second requestor device, based at least in part on the cached item information that includes the representative location of the selected cluster. New item location coordinates for the item within the mapped space can be received from a data collection device, and in response to receiving the new item location coordinates, the item information for the item can be removed from the cache. A determination can be performed that the estimated location of the item is inconsistent with the map information and with item planogram information, including: (i) identifying a fixture for the item according to the item planogram information, (ii) identifying location coordinates for the fixture according to the map data, and (iii) determining that the location coordinates for the fixture according to the map data are not within a threshold distance of the estimated location of the item. In response to determining that the estimated location of the item is inconsistent with the map information and with item planogram information, instructions can be generated to perform a work task, including (i) moving to the item in the mapped space, and (ii) when located near the item in the mapped space, selecting or scanning the item. The instructions to perform the work task can be provided to a data collection device. Selection or scan data can be received from the data collection device that corresponds to a selection or scan of the item, the selection or scan data including reliable item location coordinates for the item. The reliable item location coordinates for the item can be provided to the requestor device.

The systems, devices, program products, and processes described throughout this document can, in some instances, provide one or more of the following advantages. Even though limited or no assigned location data may exist for an item, and even though each distinct data point associated with a selection or scan of the item may be considered as having unknown reliability in isolation, an accurate location can be determined for the item. Item location coordinate data for an item can be supplemented with data for similar items, thus improving data analysis results. Item location information may be cached such that computing processing resources and communication bandwidth may be conserved. Item locations can be determined even though potentially inaccurate location signals may exist in crowdsourced data, through techniques which differentiate between accurate and inaccurate location indicators. Item locations can be determined even though planned/predetermined location data may be inaccurate, such as data associated with a retail store's planogram, which may become inaccurate as products are moved to different locations within the store and ultimately deviate from the planogram. Further, product substitutions performed by vendors within vendor-managed portions of the store may be more readily identified. Item locations can be determined when layout changes of a mapped space may occur, such as during a store remodel when items are moved to temporary locations. Further, such temporary movements of items may be more readily identified. Causes of potential inconsistencies between planogram location lists and corresponding mapped spaces may be more readily determined. Fixture locations may be more readily verified, including discrepancies between planned fixture locations and actual fixture locations. Patch data may be generated for a mapped space for correcting identified map inconsistencies. The patch data may be applied when location information that pertains to a relevant portion of the map is requested, thus providing accurate location information in a timely manner without spending time and resources to directly update the map data. Providing accurate location information for items and fixtures in a mapped space can facilitate other work processes, such as stocking products and fulfilling customer orders.

Other features, aspects and potential advantages will be apparent from the accompanying description and figures.

DESCRIPTION OF DRAWINGS

Like reference symbols in the various drawings indicate like elements

DETAILED DESCRIPTION

This document describes technology that can determine an estimated location of an item within a mapped space using crowdsourced data. In general, maintaining location information for items within a mapped space (e.g., product locations within a store or warehouse) can be challenging, since items may be moved throughout the mapped space by various personnel (e.g., store employees) without updating location information for the items in a database. Also, fixtures for storing the items may be moved, and/or an item layout of the mapped space may change over time. Item location data can be used to guide individuals (e.g., customers) through the mapped space to an item, so inaccurate item location data is generally problematic. To solve this problem, crowdsourced item location data (e.g., based on item selections or scans performed by various different individuals within the mapped space) can be leveraged to dynamically and automatically determine the current location of items within the mapped space. For example, customer locations can be correlated with various actions, such as product scans and checking items off of a digital shopping list, and data associated with the actions can be aggregated to determine a location for a product within a store map. Other data sources may also be used, including product scans performed by workers, robots, and others, and techniques can be used to aggregate various location information across different data sources.

Figure 1A:
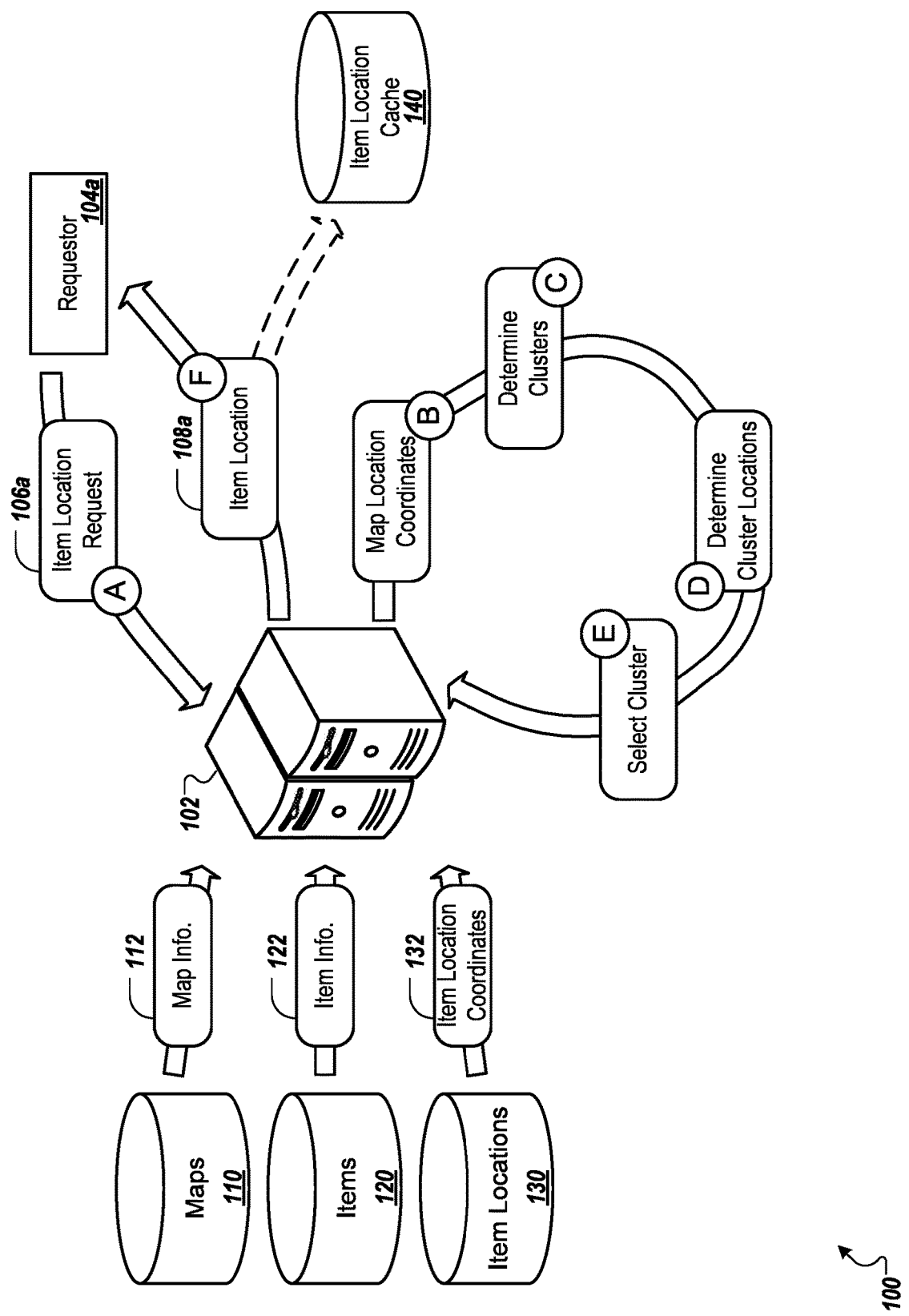
FIGS. 1A and 1B are conceptual drawings of an example system for determining a location of an item from crowdsourced data.
Figure 1B:
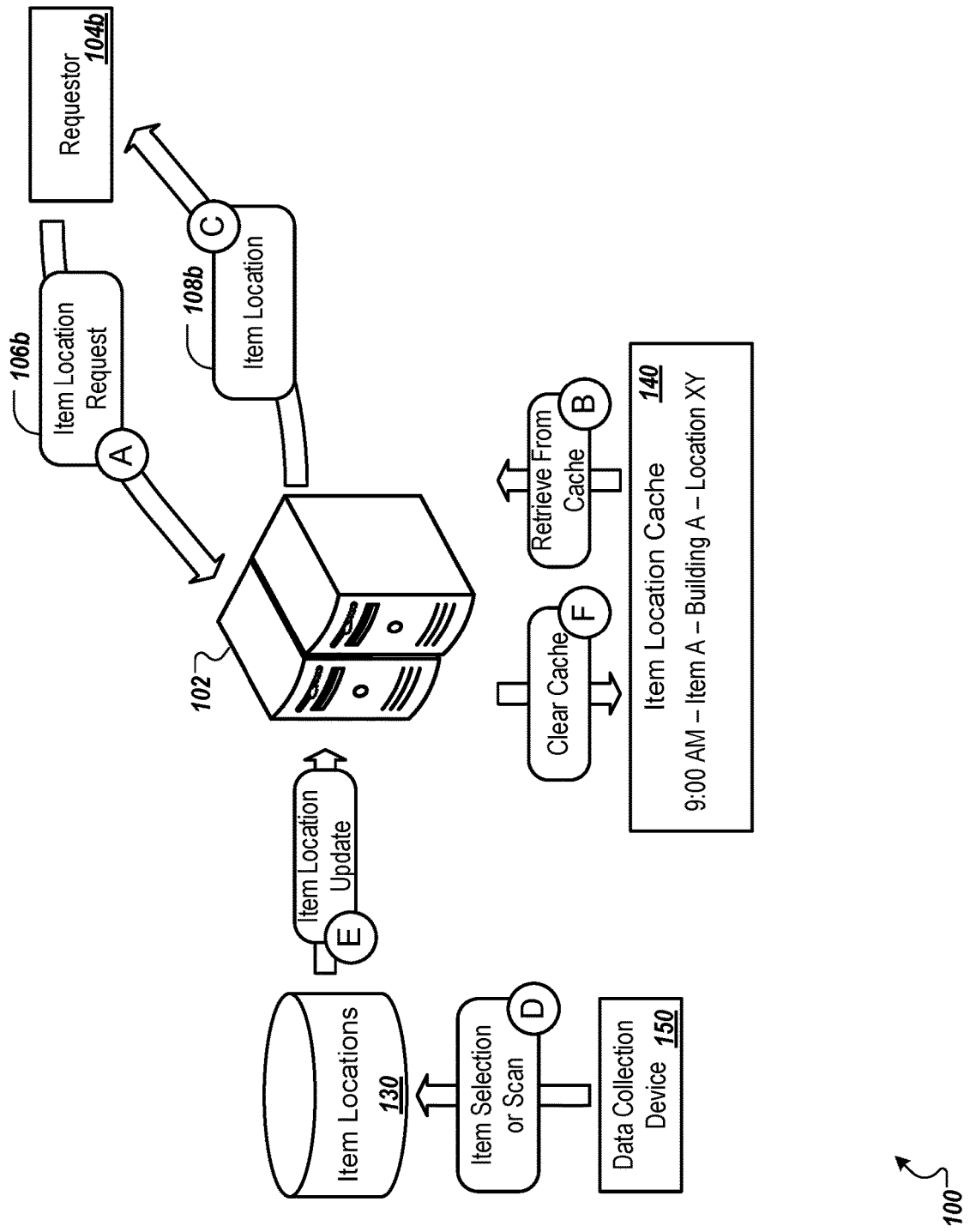

FIGS. 1A and 1B are conceptual diagrams of an example system 100 for determining a location of an item from crowdsourced data. In the depicted example, the system 100 includes one or more computing servers 102 that communicate with one or more requestor devices 104 (e.g., over a wireless and/or wired communication network) to receive item location requests and, in response, to provide item location data. In some examples, the computing servers 102 can represent various forms of servers, including, but not limited to network servers, web servers, application servers, or a server farm. For example, the computing servers 102 can receive data from various sources (e.g., databases, file systems, and/or cached data sources), can execute software that processes the received data, and can provide information based on the processed data to one or more requestor devices 104. In some examples, the requestor device 104 can represent various forms of processing devices including, but not limited to, a desktop computer, a laptop computer, a handheld computer, a tablet computer, a personal digital assistant (PDA), a smart phone, or a combination of two or more of these data processing devices or other data processing devices. In some examples, the requestor device 104 can represent another computing server system.

Figure 2:
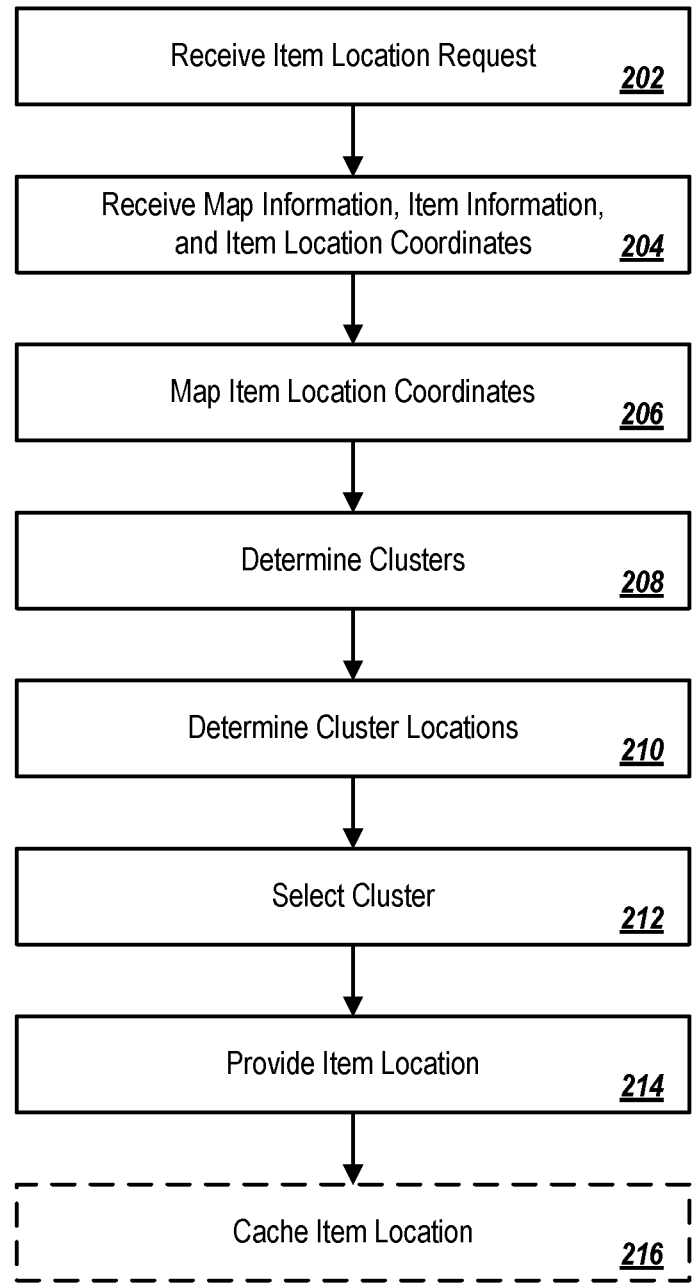
FIG. 2 shows an example process for determining a location of an item from crowdsourced data.

Referring now to FIG. 2, an example process 200 for determining a location of an item from crowdsourced data is shown. The process 200 can be performed by components of the system 100, for example, and will be described with reference to FIGS. 1A and 1B. However, other systems may be used to perform the same or a similar process.

At box 202, an item location request is received. Referring again to FIG. 1A, during stage (A), the computing servers 102 receive an item location request 106a from the requestor device 104a. For example, a user of the requestor device 104a can employ an application executed by the device 104a to request item location information from the computing servers 102.

In some implementations, an application executed by a requestor device may include an interface with which a device user may interact to indicate an item for which location information is to be provided. In some implementations, the interface can include one or more controls for indicating the item. For example, the interface can include a text entry control for entering an item identifier and/or one or more item search parameters. As another example, the interface can include a voice control for providing voice input for entering the item identifier and/or one or more item search parameters. As another example, the interface can include an image capture control for initiating a capture of an image of the item, its identifier (e.g., a barcode or other sort of item identification code), and/or a representation of the item (e.g., a printed or electronically displayed page showing the item).

In some implementations, the interface may include one or more selection controls for selecting an item for which location information is to be provided. For example, the interface can include a list of items matching one or more search parameters provided by the user, and the user can select the item from the list.

In some implementations, an interface may provide item location information with a presented image and/or description of the item. For example, location information may be automatically requested and presented by an interface, without explicit input from a user. As another example, the user can select a location request control to explicitly request location information for the item.

In some implementations, an item location request may include an item identifier. For example, the item location request 106a can include an identifier of an item indicated by a user of the requestor device 104a. As another example, the item location request 106a can include an identifier of an item depicted in an image and/or associated with an item description being presented by the requestor device 104a.

In some implementations, an item location request may include location information for a device that submitted the request. For example, the requestor device 104a can include a current location associated with the device (e.g., based on Global Positioning System (GPS) data, Wi-Fi triangulation data, user-entered data, or other suitable location data received with permission of the device user) with the item location request 106a. The computing servers 102, for example, can locate an item that is in a same space (e.g., an indoor space such as a store, warehouse, or another sort of building) and/or is located near the requestor device 104a.

In some implementations, an item location request may be received using an application programming interface (API). For example, the computing servers 102 can receive various item location requests 106 from various types of requestor devices 104 (e.g., computing devices or computing server systems) executing various different applications, through a common interface. In response to receipt of an item location request for an item, for example, the computing servers 102 can provide item location information 108 for the item using the common interface.

At box 204, map information, item information, and item location coordinates are received. Referring again to FIG. 1A, the computing servers 102 can receive map information 112 from a map information data source 110, item information 122 from an item information data source 120, and item location coordinates 132 from an item location data source 130. The data sources 110, 120, and 130, for example, can include one or more of databases, file systems, and/or cached data sources.

The map information data source 110, for example, can include, for each of a plurality of maps (e.g., maps of indoor spaces, such as stores, warehouses, or other spaces), map information that plots the positions and boundaries of various structures and areas within a space. In general, each of the maps may be associated with a different location, however in some examples two or more locations may share a similar map. For example, a particular chain of stores may maintain a different (or similar) store map for each different location at which the chain has a store. The computing servers 102, for example, can retrieve map information 112 from the map information data source 110 for a space that corresponds to a location indicated by the received item location request 106a.

Figure 3A:
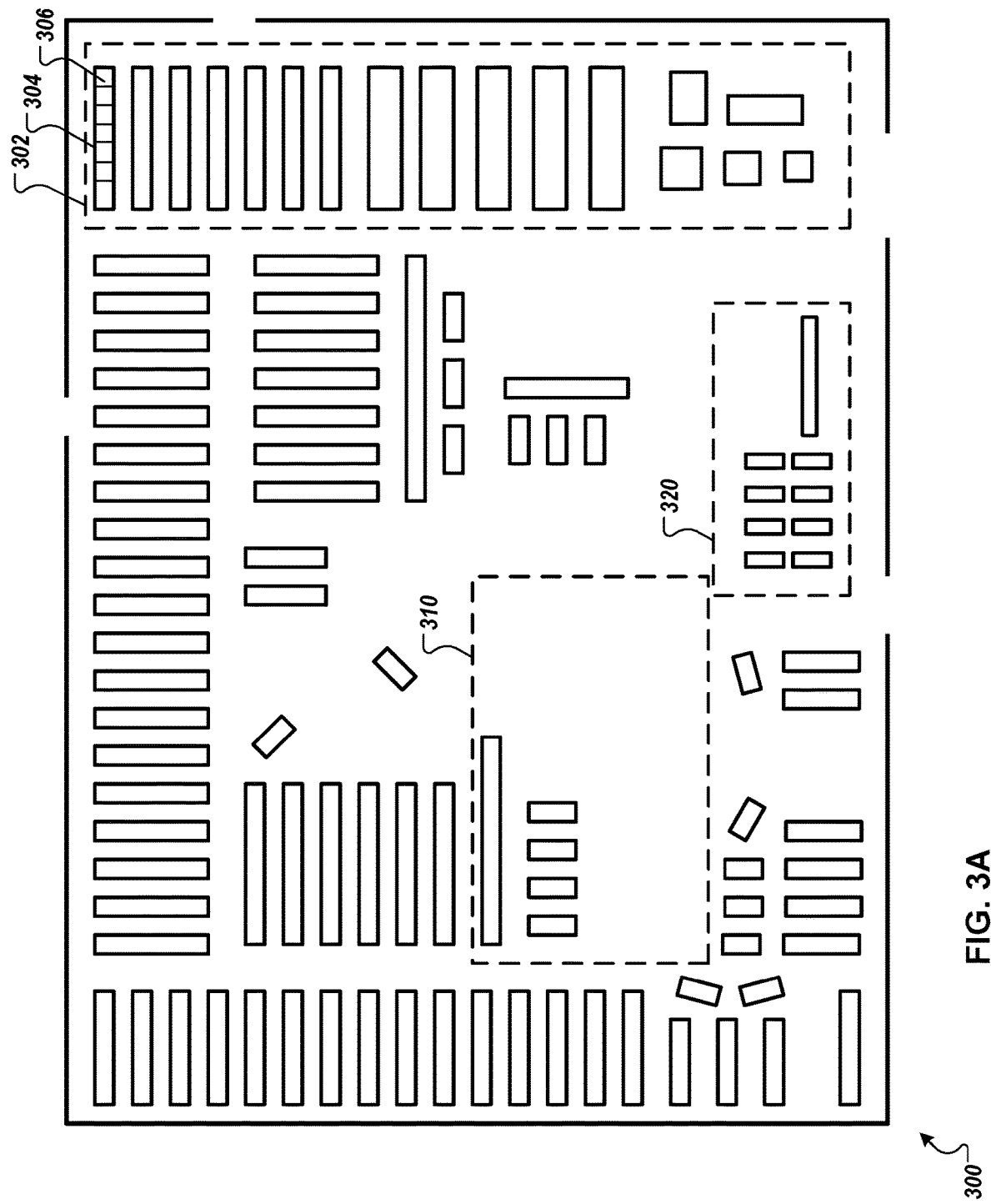
FIGS. 3A-C show an example of determining a location of an item within a mapped space based on clustered data points.

Referring now to FIG. 3A, an example mapped space 300 is shown. In the present example, the mapped space 300 (e.g., a store map) includes various areas (e.g., departments), and includes various fixed and/or mobile fixtures (e.g., aisles, sections, shelves, racks, bins, and other fixtures) within the areas. In some implementations, mapped spaces may be organized into a location hierarchy that includes general locations, one or more optional intermediate locations within a general location, and a discrete location within an intermediate location or general location. For example, a location hierarchy for a location within a particular store may include one or more of a department, an aisle, and a section for the location. In the present example, the mapped space 300 includes various general locations, including department 302 (e.g., a grocery department), department 310 (e.g., a menswear department), and area 320 (e.g., a checkout register area), each general location encompassing a separate area within the mapped space 300. Within the department location 302, for example, are included a plurality of aisles (e.g., aisle 304, an intermediate location within a general location.). Within the aisle 304, for example, are included a plurality of sections (e.g., section 306, e.g., a discrete location within an intermediate location.).

In some implementations, a mapped space may be associated with a coordinate system (e.g., an XY coordinate system), and each of the general locations, intermediate locations, and discrete locations within the mapped space may be plotted on a map based on coordinates corresponding to the locations. For example, the mapped space 300 may be associated with a coordinate system that facilitates rendering of the departments 302 and 310 (e.g., along with other departments), area 320 (along with other areas), the various aisles, sections, and fixtures within the departments and areas, and indications of one or more items located throughout the mapped space.

Referring again to FIG. 1, for example, the item information data source 120 can include, for each of a plurality of items (e.g., unique or common items, such as store products, inventory stock, or other items), an item identifier, item taxonomy information (e.g., information relevant to a classification of the item within a classification hierarchy), and optionally, item planogram information that indicates assigned locations of the item within one or more mapped spaces. The computing servers 102, for example, can retrieve item information 122 from the item information data source 120 for an item having an item identifier provided in the received item location request 106*a*.

In some implementations, item taxonomy information may include an item classification hierarchy that includes a general classification level, one or more intermediate classification levels under the general classification level, and a discrete classification level for an item. For example, item taxonomy information for a particular item supplied by a particular chain of stores may include a department level, a class level, and an item level. In the present example, the item location request 106*a* can be for item location information that pertains to a particular type of shirt, and the item taxonomy information for the shirt indicates that the shirt is classified as being from the Menswear Department (e.g., a general item classification level), as a t-shirt within the Menswear Department (e.g., an intermediate item classification level), and as an Albert Einstein men's t-shirt (e.g., a discrete item classification level).

In some implementations, item planogram information that indicates an assigned location of an item within a mapped space may be included in the item information, if such information exists for the item. The computing servers 102, for example, can retrieve item information 122 from the item information data source 120 that includes an assigned location of the item within a mapped space. The mapped space, for example, can correspond to a location indicated by the received item location request 106*a*. In general, item planogram information for an item and a mapped space can indicate one or more assigned locations for the item within the mapped space according to a location hierarchy used to organize the mapped space. For example, the item planogram information for the item can include one or more general locations for the item, one or more intermediate locations within a general location, and/or one or more discrete locations within an intermediate location or general location. In the present example, the Albert Einstein t-shirt may be stocked at a movable fixture (e.g., a rack) that does not have a fixed location within the mapped space 300 (shown in FIG. 3), and thus may be associated with item planogram information that indicates that the item is assigned to a general location (e.g., the menswear department 310). In other examples, an item may be assigned to a discrete fixed location, such as a point location associated with a particular fixture within a mapped space, or a portion of the fixture. In the present example, a particular grocery item (e.g., canned tuna) may be stocked at a fixed location within the mapped space 300, such as in section 306 of aisle 304 of the grocery department 302. In other examples, an item may not be assigned to any particular location, and thus may not be associated with any item planogram information.

The item location data source 130, for example, can include, for each of one or more items located within a mapped space, item location coordinates that correspond to various locations within the mapped space at which the item has been previously selected or scanned by various different individuals over time. In some implementations, the item location coordinates may be based on an XY coordinate system used for mapping a corresponding space. Referring now to FIG. 1B, for example, a data collection device 150 (e.g., a mobile computing device such as a handheld computer, a tablet computer, a personal digital assistant (PDA), a smart phone, or another sort of mobile computing device) can be used by an individual (e.g., a shopper) to collect data for various items (e.g., products) within a space (e.g., a store). For example, the data collection device 150 can execute an application which can be used to select or scan an item. In response to the item selection or scan, for example, the device 150 can provide data to the item location data source 130 that indicates an identifier of the selected or scanned item, and a device location in the space at which the selection or scan occurred. The location of the device 150, for example, can be based on Global Positioning System (GPS) data, Wi-Fi triangulation data, user-entered data, or other suitable location data, and can be provided after receiving appropriate permission from a device user. Selecting an item, for example, may include selecting a representation of the item presented by an interface of the data collection device 150. Scanning an item, for example, may include capturing an image of the item and/or an item identifier (e.g., a barcode) using an image capture device (e.g., a camera) of the data collection device 150. After receiving the identifier of the selected or scanned item and the location in the space at which the selection or scan occurred, for example, the item location data can be maintained by the item location data source 130, along with a corresponding timestamp.

Referring again to FIG. 1A, for example, the computing servers 102 can retrieve item location coordinates 132 from the item locations data source 130 for an item having an item identifier provided in the received item location request 106a, and for a space that corresponds to a location indicated by the received item location request 106a. In the present example, the item location coordinates 132 retrieved for the item location request 106a for a particular item (e.g., the Albert Einstein t-shirt) within a particular space (e.g., Building A) includes a set of location coordinates within the space at which the item has been previously selected or scanned by various different individuals over time.

In some implementations, item location coordinates may be retrieved only for item selections or scans that have occurred within a particular time window. For example, the computing servers 102 can retrieve item location coordinates 132 from the item locations data source 130 for item selections or scans that have occurred in the most recent week, month, three months, or other suitable time window. In general, more recent item selections or scan may be considered as being more reliable and may be thus associated with higher confidence levels.

In some implementations, an initial number of retrieved item location coordinates may be compared to a threshold value (e.g., fifteen, thirty, one hundred, or another suitable value), and additional item location coordinates may be retrieved for one or more related items (e.g., based on an item taxonomy) when the initial number of retrieved item location coordinates does not meet the threshold value. For example, a number of item selections or scans of an infrequently selected or scanned item may not generate a significant amount of data, and may negatively impact further data analysis. By supplementing item location coordinate data for an item with data for related items, data analysis results may be improved. In the present example, a number of retrieved item location coordinates for device selections or scans of the Albert Einstein men's t-shirt that occurred during the time window may not meet the threshold number of item location coordinates, and the item location coordinate data for the item may be supplemented with data for one or more similar items.

In some implementations, supplementing item location coordinate data for an item may include retrieving additional item location coordinates for items that have been selected or scanned in a same space (e.g., building, store, or warehouse) as the item, and that are associated with item taxonomy information that indicates one or more shared classification levels with the item, the shared classification levels being one or more classification levels above a discrete item classification level. In the present example, to supplement item location coordinates retrieved for the Albert Einstein men's t-shirt, item location coordinates can be retrieved by the computing servers 102 for items sharing an intermediate classification level with the item (e.g., men's printed t-shirts).

Figure 3B:
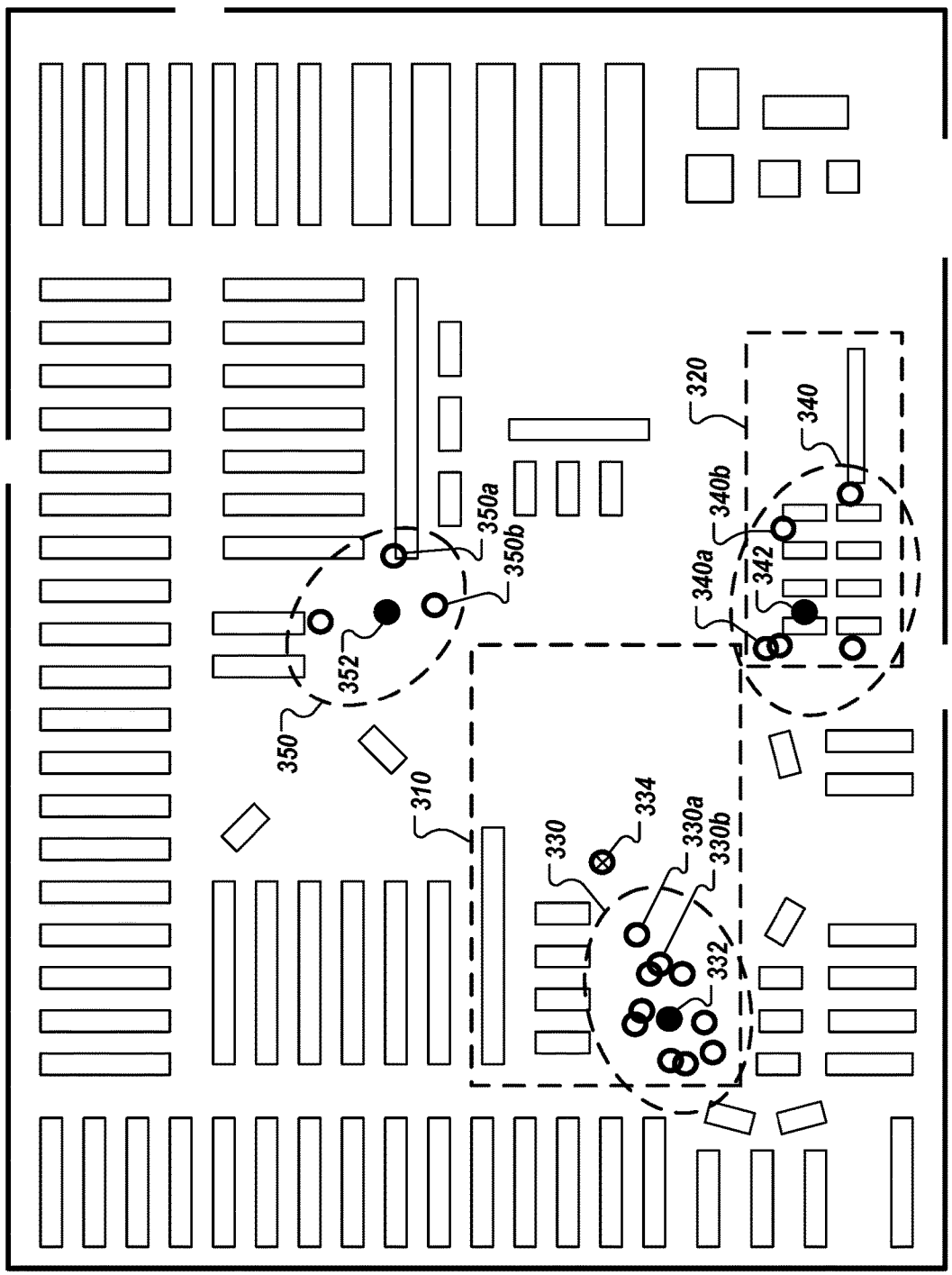

Referring again to FIG. 2, at box 206, item location coordinates are mapped. As shown in FIG. 1A, for example, during stage (B), the computing servers 102 can map each of the received item location coordinates 132 for an item, and can optionally map supplemental location coordinates received for one or more items that are related to the item. Referring now to FIG. 3B, an example of mapping item location coordinates with respect to the mapped space 300 is shown. For example, each set of item location coordinates 132 can be represented as a data point (e.g., data points 330a, 330b, 340a, 340b, 350a, 350b, etc.) in a two dimensional space, and can be positioned within the two dimensional space based on its location coordinate values (e.g., XY coordinate values). In the present example, each of the data points 330a, 330b, 340a, 340b, 350a, 350b, etc., corresponds to a location within the mapped space 300 at which a selection or scan of a particular item (e.g., the Albert Einstein t-shirt) occurred, and optionally, a location at which a selection or scan of a related item (e.g., a men's printed t-shirt) occurred.

In general, different individuals may exhibit different tendencies for selecting or scanning items within a mapped space. For example, some individuals may tend to scan or select an item when the items is collected, near an original location of the item. Other users, for example, may tend to scan or select all collected items together, at a location that may or may not be near an original location of any of the collected items. By analyzing item data and aggregated location data for an item that has been selected or scanned by different users, for example, an accurate location can be determined for the item, even though limited or no assigned location data exists for the item, and even though each distinct data point associated with a selection or scan of the item may be considered as having unknown reliability in isolation.

In some implementations, one or more item location coordinates for an item may be excluded, based on selections or scans of other items by an individual that selected or scanned the item having occurred within a particular time window and distance range. For example, the computing servers 102 can analyze the item location data source 130 and determine a set of items that have been selected or scanned by an individual within the time window (e.g., one minute, two minutes, five minutes, or another suitable time window), and locations at which each of the items in the set of items have been selected or scanned. If the locations are within range of each other (e.g., one foot, two feet, three feet, or another suitable distance), for example, the corresponding item location coordinates may be determined as being unreliable, and may be excluded from further analysis.

Referring again to FIG. 2, at box 208, clusters are determined. As shown in FIG. 1A, for example, during stage (C), the computing servers 102 can determine a plurality of clusters in a two dimensional space for data points corresponding to the received item location coordinates 132. In some implementations, a technique for determining the clusters may include an unsupervised machine learning algorithm. For example, the machine learning algorithm can accept as a parameter a number of clusters (e.g., three clusters, four clusters, five clusters, or another suitable value) in which to group the data points. Referring again to FIG. 3B, for example, data points 330a, 330b, etc. have been grouped into cluster 330, data points 340a, 340b, etc. have been grouped into cluster 340, and data points 350a, 350b, etc. have been grouped into cluster 350.

Referring again to FIG. 2, at box 210, cluster locations are determined. As shown in FIG. 1A, for example, during stage (D), the computing servers 102 can determine a representative location for each of the determined clusters. In general, a representative location for a cluster may be based on analyzing the locations of points within the cluster, and may represent a most probable location of an item within a mapped space with respect to the cluster. In some implementations, determining a representative location of a cluster may include determining a median point of the points within the cluster. In some implementations, determining a representative location of a cluster may include eliminating one or more outliers of points within the cluster (e.g., using a filter), and determining an average or central point of the remaining points within the cluster. Referring again to FIG. 3B, for example, representative point 332 is determined for cluster 330, representative point 342 is determined for cluster 340, and representative point 352 is determined for cluster 350.

Referring again to FIG. 2, at box 212, a cluster is selected. As shown in FIG. 1A, for example, during stage (E), the computing servers 102 can select one of the determined clusters. Referring to FIG. 3B, for example, one of the clusters 330, 340, and 350 may be selected, based on a determined representative location of the cluster with respect to the mapped space 300 and/or based on one or more attributes of the cluster. Selecting a cluster, for example, may include techniques for determining which item selection or scanning technique is likely evidenced by the cluster—that is, whether the cluster includes data points representing item selections or scans that occurred in the vicinity of an item's actual location, or whether the cluster includes data points representing item selections or scans that occurred at some other location.

In some implementations, selecting one of the determined clusters may include eliminating one or more clusters that have a representative point that is located within a predefined area of a mapped space that is designated as excluding item locations. As shown in FIG. 3B, for example, the representative point 342 of cluster 340 is located within area 320 (e.g., a check-out register area). For example, some individuals (e.g., shoppers) may tend to scan or select items (e.g., products) after collecting the items (e.g., at the end of a shopping trip, before checking out). In the present example, area 320 can be designated as an area that excludes item locations, and the cluster 340 can be eliminated.

In some implementations, selecting one of the determined clusters may include eliminating one or more clusters that include fewer data points relative to other clusters. As shown in FIG. 3B, for example, cluster 350 includes fewer data points than cluster 330 and cluster 340. For example, some individuals (e.g., shoppers) may tend to scan or select items (e.g., products) in random, isolated, and/or open areas of the mapped space 300 after collecting the items. In the present example, cluster 350 can be eliminated based on the cluster including fewer data points than other clusters.

In some implementations, selecting one of the determined clusters may include selecting one or more clusters that have a representative point that is located within an area that corresponds to an assigned location for an item, based on its planogram information. For example, the item planogram information can indicate a general location, an intermediate locations within a general location, or a discrete locations within an intermediate location or general location for the item. In the present example, the Albert Einstein t-shirt's item planogram information indicates that the item is assigned to a general location of the menswear department 310. Since the representative point 332 of the cluster 330 is located within an area that corresponds to the menswear department 310, for example, cluster 330 can be selected.

Figure 3C:
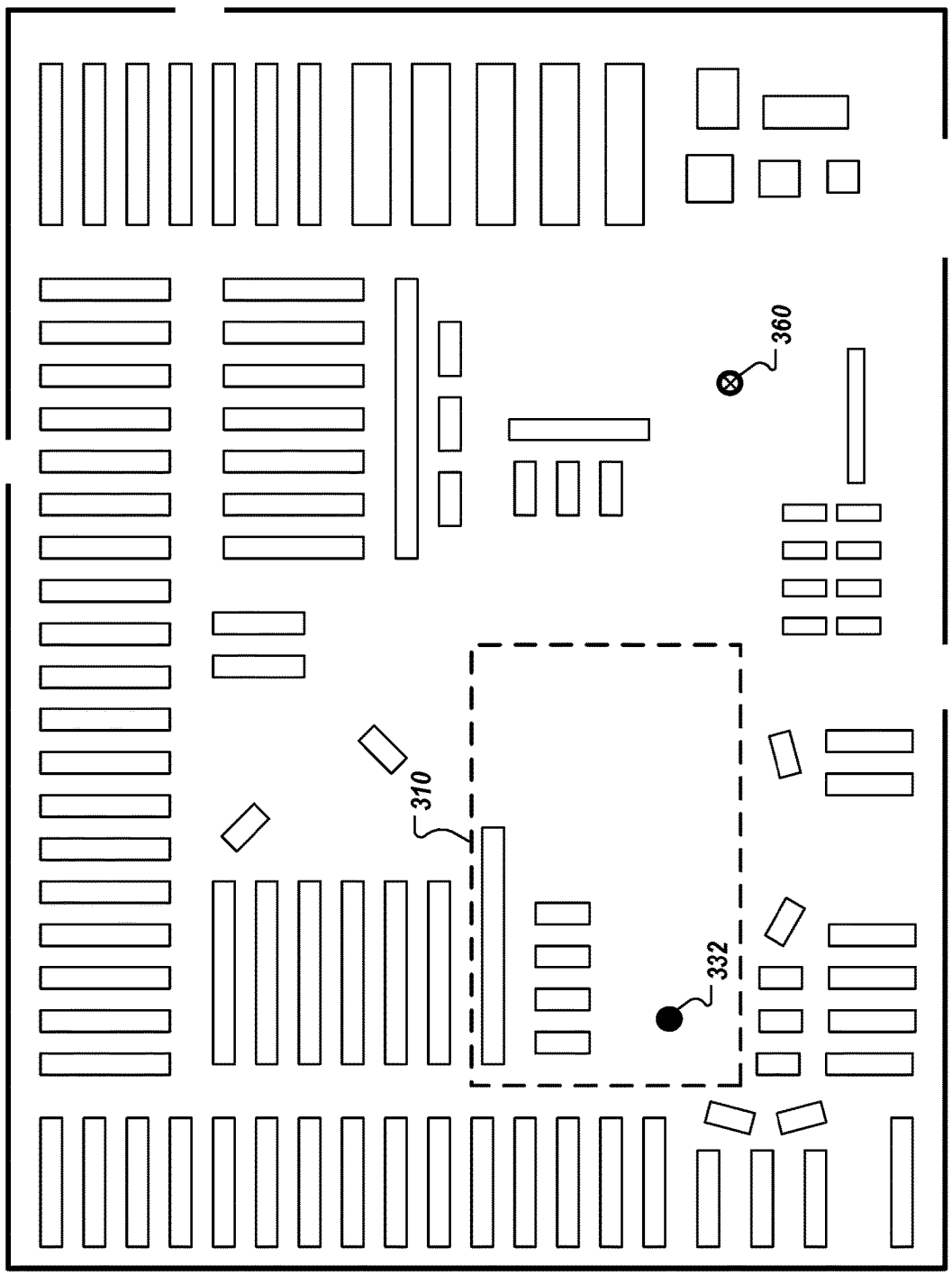

Referring again to FIG. 2, at box 214, an item location is provided. As shown in FIG. 1A, for example, during stage (F), the computing servers 102 can provide item location information 108a for an item to the requestor device 104a, in response to receipt of the item location request 106a. Referring now to FIG. 3C, an example of item location information with respect to the mapped space 300 is shown. In the present example, the representative point 332 represents an estimated location of the item (e.g., the Albert Einstein t-shirt) within the area 310 (e.g., the menswear department) of the mapped space 300 (e.g., Building A), based on crowdsourced data that includes item selections or scans previously performed by various different individuals in the mapped space 300. In some implementations, item location information may include item location coordinates that identify an item's location within a two dimensional space. For example, the item location information 108a may include XY coordinates for the Albert Einstein t-shirt within the mapped space 300.

In some implementations, an application executed by a requestor device may present a device user with received item location information. For example, the requestor device 104a can include an interface that displays a map that shows a portion of or all of the mapped space 300, and includes an item icon that represents an item's location within the mapped space (e.g., the position of point 332), based on its XY coordinates. In the present example, the interface can also display a device icon 360 that represents a current location of the device 104a within the mapped space 300, such that a device user may navigate toward the item's location.

In some implementations, an application executed by a requestor device may present a device user with an option to provide feedback for received item location information. Referring again to FIG. 1A, for example, the requestor device 104a can include an interface that facilitates user feedback regarding the received item location information 108a for the item. In the present example, a device user can provide feedback that indicates whether the received item location information 108a was accurate or was not accurate. The computer servers 102 can receive the feedback, for example, and can use the feedback to improve item location information 108 that may be provided for the item to requestor devices 104 that submit subsequent item location requests 106. In some implementations, using feedback to improve item location information may include modifying one or more conditions for retrieving item location coordinates for an item having an item identifier provided in a received item location request. For example, a time window used for retrieving item selections or scans can be reduced such that more recent item selections or scans are retrieved (e.g., a time window may be reduced from the most recent week to the most recent three days.) As another example, additional item location coordinates may not be retrieved for one or more related items (e.g., based on an item taxonomy) for an item, even though a number of retrieved item location coordinates for device selections or scans of the item may not meet a threshold number of item location coordinates Referring again to FIG. 2, at box 216, an item location is optionally cached. As shown in FIG. 1A, for example, during stage (F), the computing servers 102 can maintain item location information 108a for an item in an item location cache 140 (e.g., computing memory of the computing servers 102 or another sort of cache that can provide quick access to the information). In general, cached item location information may be provided to requestor devices 104 that submit subsequent item location requests 106. By caching item location information, for example, computing processing resources and communication bandwidth may be conserved by the system 100.

Referring now to FIG. 1B, an example of maintaining an item location information cache by the example system 100 is shown. During stage (A), the computing servers 102 may receive a subsequent item location request 106b from requestor device 104b (e.g., at a time after the item location request 106a was received from requestor device 104a). In the present example, the item location request 106b can include an item identifier for a particular type of item (e.g., Item A, an Albert Einstein men's t-shirt) and a mapped space identifier for a particular mapped space (e.g., Building A).

The item location cache 140 can associate, for example, for each of a plurality of unique pairings of item identifier and mapped space identifier, previously determined item location coordinates for the corresponding item within the corresponding mapped space, and optionally a date/time value at which the unique pairing was determined and/or was added to the cache 140. In the present example, the computing servers 102 identify an item identifier/mapped space identifier pairing in the item location cache 140 (e.g., Item A/Building A) that matches an item identifier/mapped space identifier pairing received in the item location request 106b. If the computing servers 102 do not identify a matching item identifier/mapped space identifier pairing, for example, the computing servers 102 may execute one or more processes for determining location coordinates for the item within the mapped space.

During stage (B), the computing servers 102 can retrieve item location coordinates from the item location cache 140. In the present example, the computing servers 102 retrieve from the item location cache 140 the item location coordinates (e.g., Location XY) for the item identifier/mapped space identifier pairing that matches the item identifier/mapped space identifier pairing in the item location request 106b. During stage (C), the retrieved item location coordinates (e.g., Location XY) is provided by the computing servers 102 to the requestor device 104b as item location information 108b.

In general, data may be cleared from an item location cache at appropriate times. For example, if item location data available for an item changes over time (e.g., one or more additional item selection or scans were to occur for an item within a mapped space), cached location data for the item may no longer be accurate. In the present example, a user of the data collection device 150 selects or scans Item A (e.g., an Albert Einstein men's t-shirt) at a location in Building A. During stage (D), location coordinates for the item selection or scan can be received by the item location data source 130, and during stage (E), the computing servers 102 can receive a notification that location data for the item has been updated. During stage (F), in response to the notification, computing servers 102 can clear the item location cache 140 of data that matches an item identifier/mapped space identifier pairing for an updated item/mapped space.

In general, data may be added, re-added, or updated in an item location cache at appropriate times. In some implementations, item location coordinates for an item identifier/mapped space identifier pairing may be updated in a cache when new item location coordinates for an item in a mapped space are received. For example, when the computing servers 102 receive an item location update for a particular item/mapped space, the servers 102 can execute one or more processes for determining estimated location coordinates for the item within the mapped space. In some implementations, item location coordinates for an item identifier/mapped space identifier pairing may be added to an item location cache when providing item location data to a requestor device. For example, when providing item location data 108 to requestor device 104, the computing servers 102 can determine whether the item location cache 140 includes an item identifier/mapped space identifier pairing associated with the item location data. If the item location cache 140 does not include the item identifier/mapped space identifier pairing (e.g., the pairing has previously been cleared from the cache in response to an item location update), the computing servers 102 can add the pairing, corresponding item location coordinates, and optional timestamp data to the cache 140. For example, under some conditions, a process for determining location coordinates for an item may be quickly performed, and executing the process before such data is requested may not have an overall benefit when location data that pertains to the item is frequently being updated.

Figure 4:
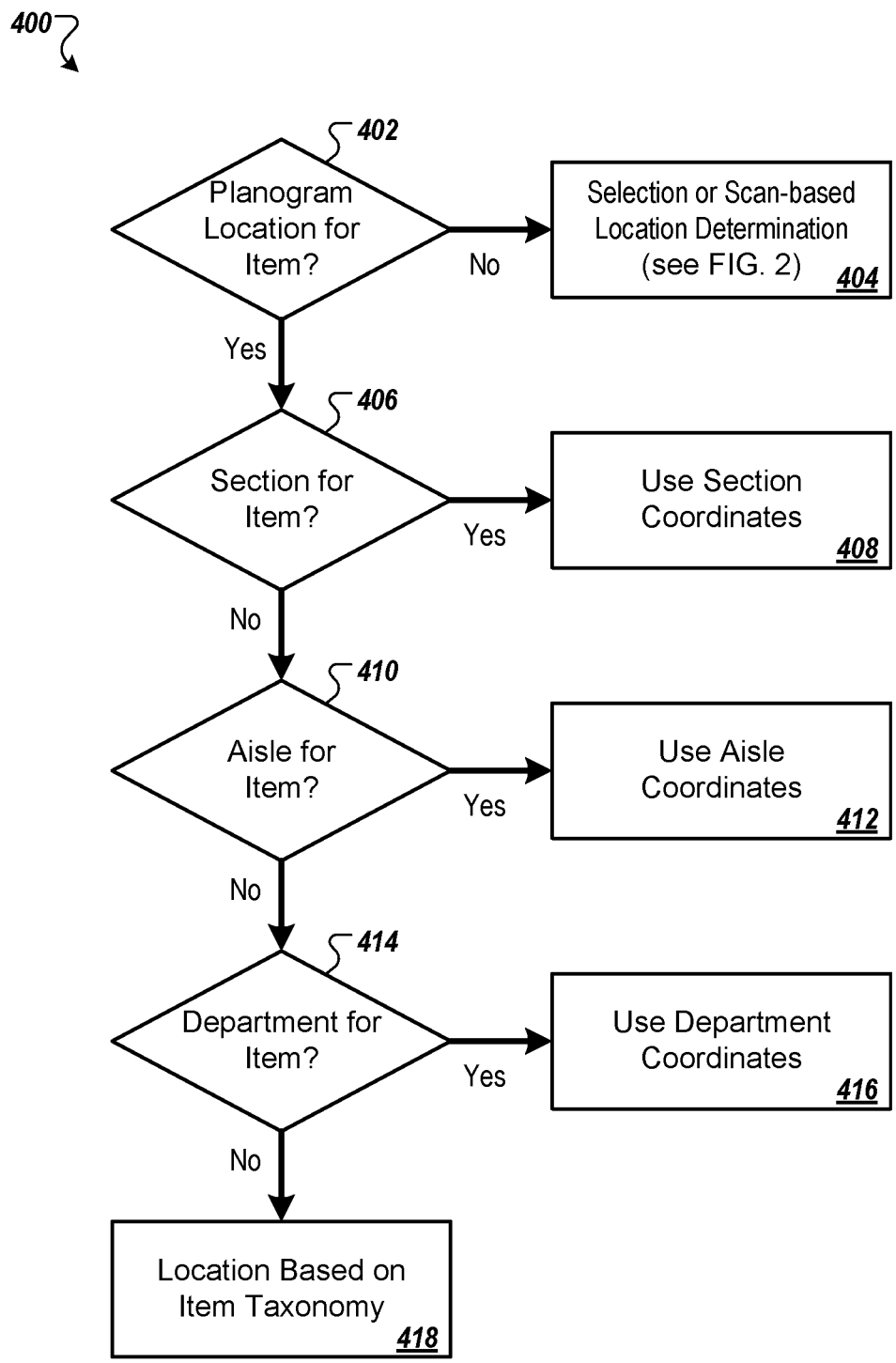
FIG. 4 shows an example process for determining a location of an item based on an availability of planogram data for the item.

FIG. 4 shows an example process 400 for determining a location of an item based on an availability of planogram data for the item. The process 400 can be performed by components of the system 100, for example, and will be described with reference to FIGS. 1A and 1B. However, other systems may be used to perform the same or a similar process.

At box 402, a determination of whether a planogram location for an item exists is performed. Referring to FIG. 1A, for example, the computing servers 102 can determine whether an item has a planogram location. In general, a planogram location can be an assigned location for an item within a mapped space. For example, some items (e.g., products) may be assigned specific locations within a mapped space, such a particular grocery item (e.g., canned tuna) that is stocked a fixed location within the mapped space 300 (shown in FIG. 3A), such as in section 306 of aisle 304 of the grocery department 302. Other items, for example, may be associated with general locations within a mapped space, for example, an Albert Einstein t-shirt that is stocked at a movable fixture (e.g., a rack) that is at an indeterminate location within the menswear department 310 within the mapped space 300. Other items, for example, may or may not be assigned to any particular location within a mapped space, and thus may not be associated with any item planogram information.

At box 404, if a planogram location does not exist for the item, a selection or scan-based location determination process is performed. The selection or scan-based location determination process, for example, may be similar to the example process 200 for determining a location of an item from crowdsourced data, shown in FIG. 2.

At box 406, if a planogram location exists for the item, the process 400 includes determining whether a section exists for the item. Referring again to FIG. 3A, for example, a particular grocery item can be associated with planogram data that indicates that the item is assigned a location within section 306 (e.g., a portion of a shelving unit, such as a three-foot section on a designated level). At box 408, if a section exists for the item, the process 400 includes using section coordinates. In the present example, section coordinates corresponding to section 306 (e.g., a center point of the section) can be used as location coordinates for the item.

At box 410, if a section does not exist for the item, the process 400 includes determining whether an aisle exists for the item. Referring to FIG. 3A, for example, a particular grocery item can be associated with planogram data that indicates that the item is assigned a general location within aisle 304 (e.g., an aisle within a department). At box 412, if an aisle exists for the item (but not a specific section), the process 400 includes using aisle coordinates. In the present example, aisle coordinates corresponding to aisle 308 (e.g., a center point of the aisle) can be used as location coordinates for the item.

At box 414, if an aisle does not exist for the item, the process 400 includes determining whether a department exists for the item. Referring now to FIG. 3B, for example, a particular clothing item can be associated with planogram data that indicates that the item is assigned a general location within department 310 (e.g., the menswear department) within the mapped space 300. At box 416, if a department exists for the item (but not a specific aisle or section), the process 400 includes using department coordinates. In the present example, department coordinates corresponding to department 310 (e.g., a center point 334 of the department) can be used as location coordinates for the item.

At box 418, if a department does not exist for the item, the process 400 includes determining a location of the item based on an item taxonomy. For example, the computing servers 102 can reference item taxonomy information for the item maintained by the item information data source 120, and correlate the item taxonomy information with a taxonomy mapping data structure (not shown) that maps various item taxonomy classifications to mapped space locations. The taxonomy mapping data structure, for example, may be used in some situations when a planogram does not exist for an item.

Figure 5:
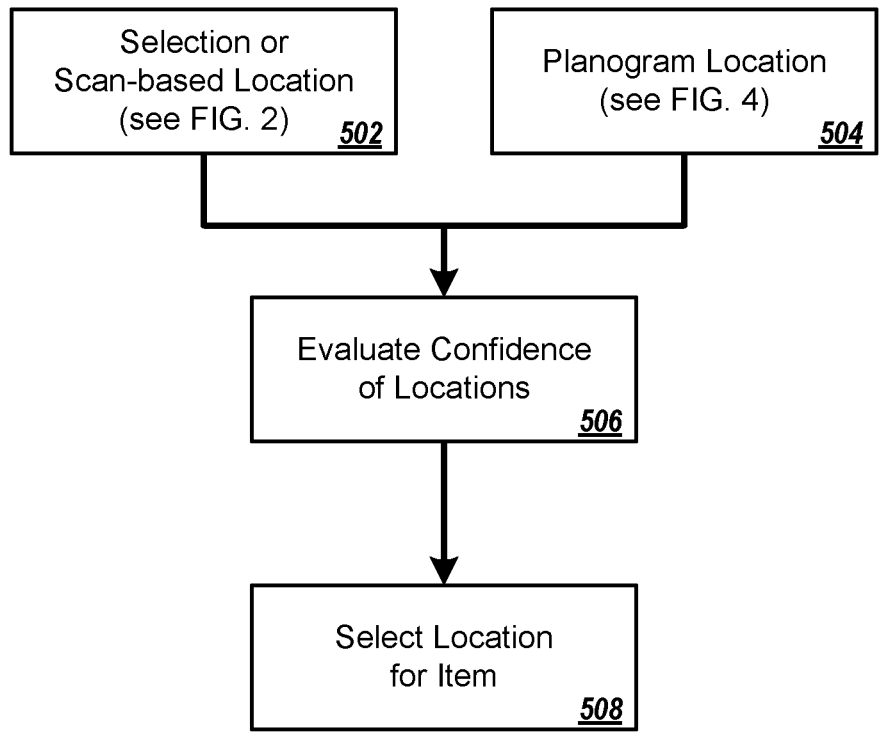
FIG. 5 shows an example process for determining a location of an item based on a confidence evaluation.

FIG. 5 shows an example process 500 for determining a location of an item based on a confidence evaluation. The process 500 can be performed by components of the system 100, for example, and will be described with reference to FIGS. 1A and 1B. However, other systems may be used to perform the same or a similar process.

At box 502, a location of an item is determined using a selection or scan-based location determination process. For example, the selection or scan-based location determination process may be similar to the example process 200 for determining a location of an item from crowdsourced data, shown in FIG. 2. Referring to FIG. 3B, representative point 332 can be determined for cluster 330 using the example process 200, and can be selected as an estimation of the location coordinates for the Albert Einstein men's t-shirt in the present example.

At box 504, a planogram location of an item is determined. For example, the example process 400 (shown in FIG. 4) for determining a location of an item based on an availability of planogram data for the item can be used for determining the planogram location of the item. For example, if the Albert Einstein men's t-shirt described in the present example is associated with planogram data assigns the item to a general location within the menswear department 310, the center point 334 of the department 310 can be selected as location coordinates for the t-shirt based on the example process 400.

At box 506, confidence values of the selection or scan-based location and the planogram location of the item are evaluated. In general, confidence values of selection or scan-based locations may be based on various factors, such as a number of selections or scans of an item used to determine the locations (e.g., a greater number of selections or scans being correlated with greater confidence values) a recency of item selections or scans (e.g., with more recent selections or scans being correlated with greater confidence values), a type of user having performed the selection or scan (e.g., with employee selections or scans being correlated with greater confidence values and customer selections or scans being correlated with lesser confidence values), a context of the selection or scan (e.g., with employee selection or scans resulting from some activities being correlated with higher confidence values than others), and/or selection or scanning techniques having been used by individuals who selected or scanned the item (e.g., with more distributed selections or scans by a particular individual being correlated with greater confidence values than concentrated selections or scans by the individual). In general, confidence values of planogram locations may be based on various factors, such as a granularity of available planogram data for an item, and/or layout changes for mapped spaces. For example, item locations that are based on planogram information that specifies a discrete item location may be correlated with greater confidence values than item locations that are based on planogram location that specifies only a general item location. As another example, if a current date falls within a date range for a layout change for a mapped space, confidence values may be reduced for item locations that are based on planogram information for the mapped space.

At box 508, a location of the item is selected from the selection or scan-based location and the planogram location of the item. In general, an item location having a greater confidence value may be selected as an estimated location of the item. In the present example, the representative point 332 of cluster 330 is selected as being a likely location of the Albert Einstein men's t-shirt instead of the center point 334 of the menswear department 310, based on the selection or scanned-based location having a higher confidence value than the planogram location. In another example, if a planogram location of an item were associated with a greater confidence value than a selection or scan-based location of the item, the planogram location of the item could be selected as a likely location of the item.

Occasionally, confidence values of both the selection/scan-based location of an item and a planogram location of the item may be unacceptably low. For example, not enough selection/scan data may exist for some items, or the selection/scan data may not be recent enough to effectively aggregate the data to reasonably determine an item's location. As another example, a mapped space (e.g., a store) may undergo a reorganization or remodel which causes its planogram information and/or its map to become inaccurate. In such cases when confidence values in item locations are low and/or when crowdsourced data is insufficient for providing accurate item locations, for example, inconsistencies in map data, item data, and item location scan data can be identified and fixed. Rather than wait for sufficient crowdsourced data to accumulate over time, for example, focused work tasks can be provided to employees to collect reliable location data for various items and fixtures in the mapped space for which data inconsistencies are present. Location data that is known to be reliable can be used to patch fix map inconsistencies, such that accurate item locations may be provided.

Figure 6:
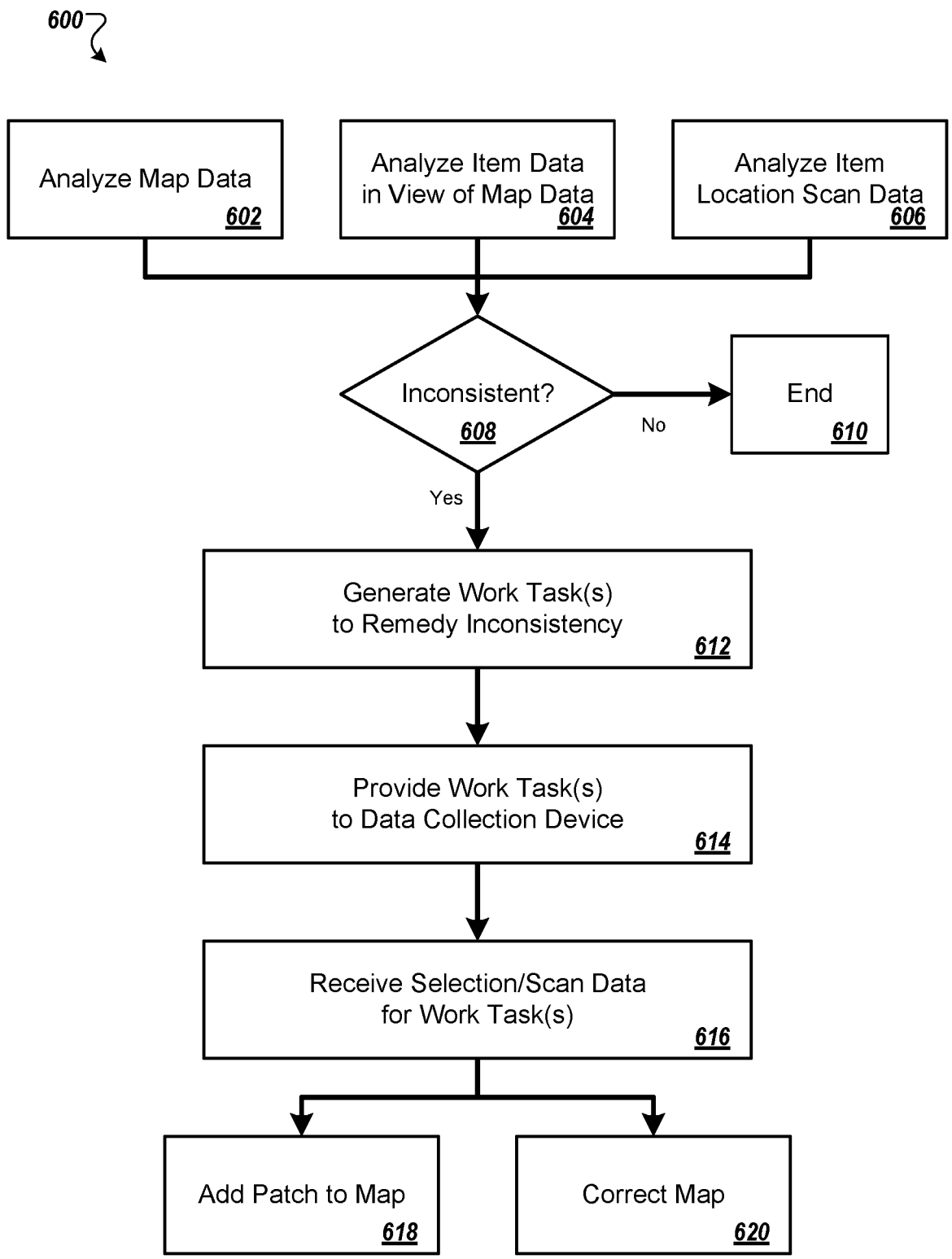
FIG. 6 shows an example process for identifying and fixing map inconsistencies.

FIG. 6 shows an example process 600 for identifying and fixing map inconsistencies. The process 600 can be performed by components of the system 100, for example, and will be described with reference to FIGS. 1A and 1B. However, other systems may be used to perform the same or a similar process.

At box 602, map data can be analyzed. Referring to FIG. 1A, for example, the computing servers 102 can analyze map information 112 from the map information data source 110. The map information 112, for example, can plot the positions and boundaries of various structures and areas within a mapped space (e.g., a store), according to an XY coordinate system, with the structures and areas being labeled with location identifiers. A location identifier for a structure and/or area, for example, can refer to one or more elements of a location hierarchy that includes general locations, one or more optional intermediate locations within a general location, and a discrete location within an intermediate location or general location. For example, a location identifier for a particular fixed fixture (e.g., a store section) may include department, aisle, and section identifiers, and may be associated with XY coordinates of the section in the store according to the mapped space. As another example, a location identifier for a particular mobile store fixture (e.g., a clothing rack) may include a department and/or a mobile fixture identifier, and may or may not be associated with specific XY map coordinates.

At box 604, item data can be analyzed in view of map data. Referring again to FIG. 1A, for example, the computing servers 102 can analyze item information 122 from the item information data source 120. For items identified in the item information data source 120, for example, the item information 122 can include item planogram information that indicates an assigned location of an item within a mapped space (e.g., a fixture location) according to a location hierarchy used to organize the mapped space. For example, item planogram information for an item may describe one or more fixture locations at which an item may be located within a store. Each fixture location, for example, can include a general location (e.g., a department), an intermediate location (e.g., an aisle), and/or a discrete location (e.g., a section) within the intermediate location and/or general location. In some implementations, item planogram information may not explicitly include specific location information for a mapped space according to an XY coordinate system. For example, by analyzing the item planogram information in the item information 122 for a particular item, the computing servers 102 may determine that the item has been assigned a department, aisle, and section according to a store's location hierarchy—however, to determine the specific XY coordinates for that location (e.g., department, aisle, and section) within a mapped space, the computing servers 102 may refer to map coordinates associated with the location in the map information 112.

At box 606, item location scan data can be analyzed. Referring again to FIG. 1A, for example, the computing servers 102 can analyze item location coordinates 132 from the item locations data source 130. For items identified in the item locations data source 130, for example, the item location coordinates 132 can be location coordinates (e.g., according to an XY coordinate system) at which the items have been previously selected or scanned by various different individuals (e.g., store employees, store customers) using mobile computing devices (e.g., data collection device 150, shown in FIG. 1B) over time. The item location coordinates 132 for an item, for example, can be associated with metadata that indicates when a selection/scan of an item occurred, a context of the selection/scan that indicates a type of user who performed the selection scan and for what reason (e.g., a customer selection/scan using a mobile shopping application, a customer checking the item off a digital shopping list, an employee scanning an item when assembling an order for a customer, an employee scanning an item when performing an inventory audit, etc.).

At box 608, inconsistencies may be identified. For example, the computing servers 102 can periodically (e.g., once per week, once per day, once per hour, or at another suitable time interval) analyze map data (e.g., from the map information data source 110), item data (e.g., from the item information data source 120), and item location scan data (e.g., from the item locations data source 130) for a mapped space (e.g., a store) to identify possible inconsistencies. To identify the inconsistencies, for example, the computing servers 102 can execute computer code (e.g., a script) that performs a series of checks against the data sources.

Inconsistencies in the map data (e.g., a computer-aided design (CAD) file), for example, may generally be caused by developer error when generating the map data. Various sorts of map data inconsistencies may exist, and may be identified by the computing servers 102 while analyzing the map data. For example, the computing servers 102 can analyze the location identifiers of structures and/or areas defined in the map data, and can determine that duplicate location identifiers exist, such as a department being defined in two or more different areas of a mapped space, an aisle/section being defined in two or more different areas of the mapped space, or other such scenarios in which duplicate location identifiers may exist in the map data. As another example, the computing servers 102 can determine whether two or more fixtures (e.g., aisles, sections, shelves, racks, bins, and other fixtures) have been mapped to a same or overlapping physical location in the mapped space (e.g., based on map coordinates of the fixtures). As another example, the computing servers 102 can determine whether one or more map design rules have been violated, such as an aisle being split across two or more floors.

Inconsistencies in the item data in view of the map data, for example, may generally be caused by data entry error when updating planogram information for items in a mapped space, by moving items to different locations in the mapped space without updating the planogram information, and/or by physically adding or rearranging fixtures in the mapped space without updating the map data. Various sorts of inconsistencies may exist between the item data and map data, and may be identified by the computing servers 102 while analyzing the data. For example, the computing servers 102 can identify fixtures (e.g., aisles, sections, shelves, racks, bins, and other fixtures) that are referenced in the item data and are not referenced in the map data. The planogram information in the item data generally includes hierarchical location information (e.g., department/aisle/section) for fixtures that store items, for example, but not specific XY coordinates for the fixtures—the specific XY coordinates for fixtures being generally found in the map data. As such, a fixture location being referenced in the item data that is not also referenced in the map data may suggest that the fixture was added to the mapped space without updating the corresponding map. As another example, the computing servers 102 can identify departments that are referenced in the item data and are not referenced in the map data. For example, a store may have been reorganized without updating the corresponding map.

Inconsistencies in the item location scan data, for example, may generally be caused by data collection practices (e.g., selecting/scanning an item on or near a fixture which stores the item vs. selecting/scanning the item in another location), and/or may be caused by factors similar to those which cause inconsistencies in the item data in view of the map data. In general, some types of selection/scans may generally be expected to provide more reliable item location coordinates than others. For example, customer selections/scans may be expected to produce unreliable item location scan data in isolation or when a minimal amount of data is available for an item, but may be expected to produce somewhat more reliable item location scan data when a significant amount of selections/scans are aggregated. As another example, the reliability of item location scan data produced from employee selection/scans may vary based on a context of the selection/scans. For example, when an employee scans an item as part of assembling an order for a customer, the item location for the item may be expected to be somewhat reliable, as employees tend to scan items for orders in the general vicinity of where the items are located in a store (e.g., within a same department or along a same aisle), if not at the precise item location. On the other hand, when an employee scans an item as part of performing an inventory audit, for example, the item location for the item may be expected to be more reliable, as employees tend to scan such items without removing the items from the fixtures on which the items are located. If the computing servers 102 determine that item location coordinates for an item in the item location scan data are reliable (e.g., based on a confidence value evaluation as described with respect to FIG. 5), for example, the computing servers 102 can identify a possible data inconsistency by identifying a fixture for the item according to the item data, identifying location coordinates for the fixture according to the map data, and comparing the location coordinates for the fixture to the determined item location coordinates according to the item location scan data. If the location coordinates for the fixture are not within a threshold distance (e.g., two feet, five feet, ten feet, twenty feet, or another suitable distance) of the determined item location coordinates according to reliable item location scan data, for example, a discrepancy may exist in the item data (e.g., the item may be associated with incorrect item planogram information), the map data (e.g., the fixture may be plotted at incorrect map coordinates), or both. If the location coordinates for the fixture are within the threshold distance of the determined item location coordinates according to reliable item location scan data, a discrepancy may not exist.

At box 610, if an inconsistency is not identified, the process 600 may end. For example, the computing server 102 may analyze the map data, item data, and item location scan data, and may not identify inconsistencies in such data. As another example, after identifying and handling various data inconsistencies, the process 600 may end until such time that the process is again initiated.

At box 612, if an inconsistency is identified, one or more work tasks can be generated to remedy the inconsistency. In general, the work tasks may include directions for an employee using a mobile computing device (e.g., data collection device 150, shown in FIG. 1B) to perform one or more discrete operations for providing location coordinates within a mapped space for an item and/or fixture. For example, if an inconsistency is identified for a structure and/or area defined in the map data (e.g., a duplicate location identifier is found for a fixture in the mapped space, such as a duplicate aisle/section), the computing servers 102 can generate a work task for the employee to move to the structure and/or area, and to indicate when the mobile computing device is at a location specified in the work task (e.g., by selecting an interface control and/or performing a scan). As another example, if an inconsistency is identified in the item data in view of the map data (e.g., a fixture is referenced in the item data that is not referenced in the map data), the computing server 102 can generate a work task for the employee to move to the fixture, and to indicate when the mobile computing device is at the fixture (e.g., by scanning a label on the fixture, by scanning an item located near the middle of the fixture, and/or by selecting an interface control). As another example, if an inconsistency is identified in the item location scan data in view of the item data and the map data (e.g., reliable item location coordinates determined for an item according to the item location scan data do not correspond to the item's location coordinates according to the item planogram information and map data), the computing server 102 can generate a work task for the employee to move to the item and/or fixture, to indicate when the mobile computing device is at the item and/or fixture (e.g., by performing one or more scans and/or by selecting an interface control), and to optionally provide updated fixture information (e.g., entering an updated location identifier of a fixture at which the item is found, such as an aisle/section identifier). In some implementations, a work task for indicating an item's location may be generated when a confidence value of the item's location is below a threshold confidence value. Various techniques for evaluating confidence values for item locations are described above with respect to FIG. 5, for example.

Figure 7:
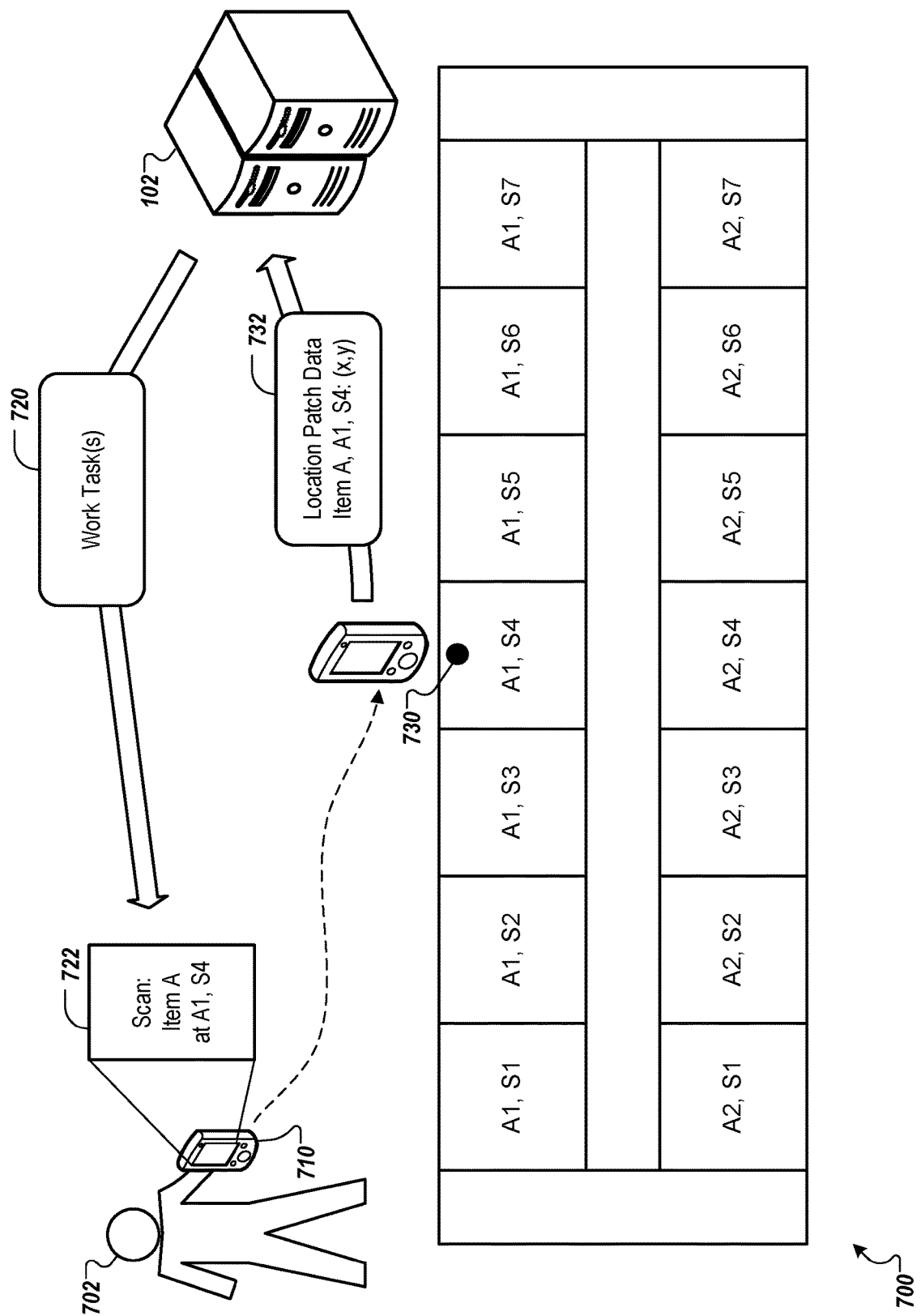
FIG. 7 shows an example of performing an item location scan to fix map inconsistencies.

At box 614, the one or more work tasks are provided to a data collection device. Referring now to FIG. 7, an example environment 700 is shown for performing an item location scan to fix map inconsistencies. As shown in FIG. 7, for example, an employee 702 (e.g., a worker who performs assigned tasks in a mapped space) can use data collection device 710 (e.g., similar to data collection device 150, shown in FIG. 1B) while performing various tasks. After identifying various inconsistencies in the map data, the item data, and/or the item location scan data, for example, the computing servers 102 can provide one or more work tasks 720 to the data collection device 710 for remedying the inconsistencies. After receiving the work task(s) 720, for example, the data collection device 710 can present instructions 722 (e.g., a visual user interface, an audible prompt, etc.) to the employee 702 for performing the task(s). In the present example, the instructions 722 include prompting the employee 702 to move to a specified fixture (e.g., Aisle 1, Section 4) and to scan a specified item (e.g., Item A).

At box 616, selection/scan data is received for the one or more work tasks. In response to receiving the instructions 722, for example, the employee 702 can move to location 730 (shown in FIG. 7) and perform the task(s) according to the instructions. In the present example, the employee can scan Item A at Aisle 1, Section 4 (e.g., by scanning a representative item in the middle of the section). After the item has been scanned, for example, the data collection device 710 can provide scan data including location patch data 732 (e.g., data indicating that Item A has been scanned in Aisle 1, Section 4 at coordinates (x, y)) to the computing devices 102. In some implementations, location patch data may include updated fixture information. For example, upon arriving at location 730, the employee 702 may determine that Item A is not located in Aisle 1, Section 4. In the present example, the employee 702 can scan item A, and can enter an updated location identifier of a fixture at which the item is found.

Figure 8:
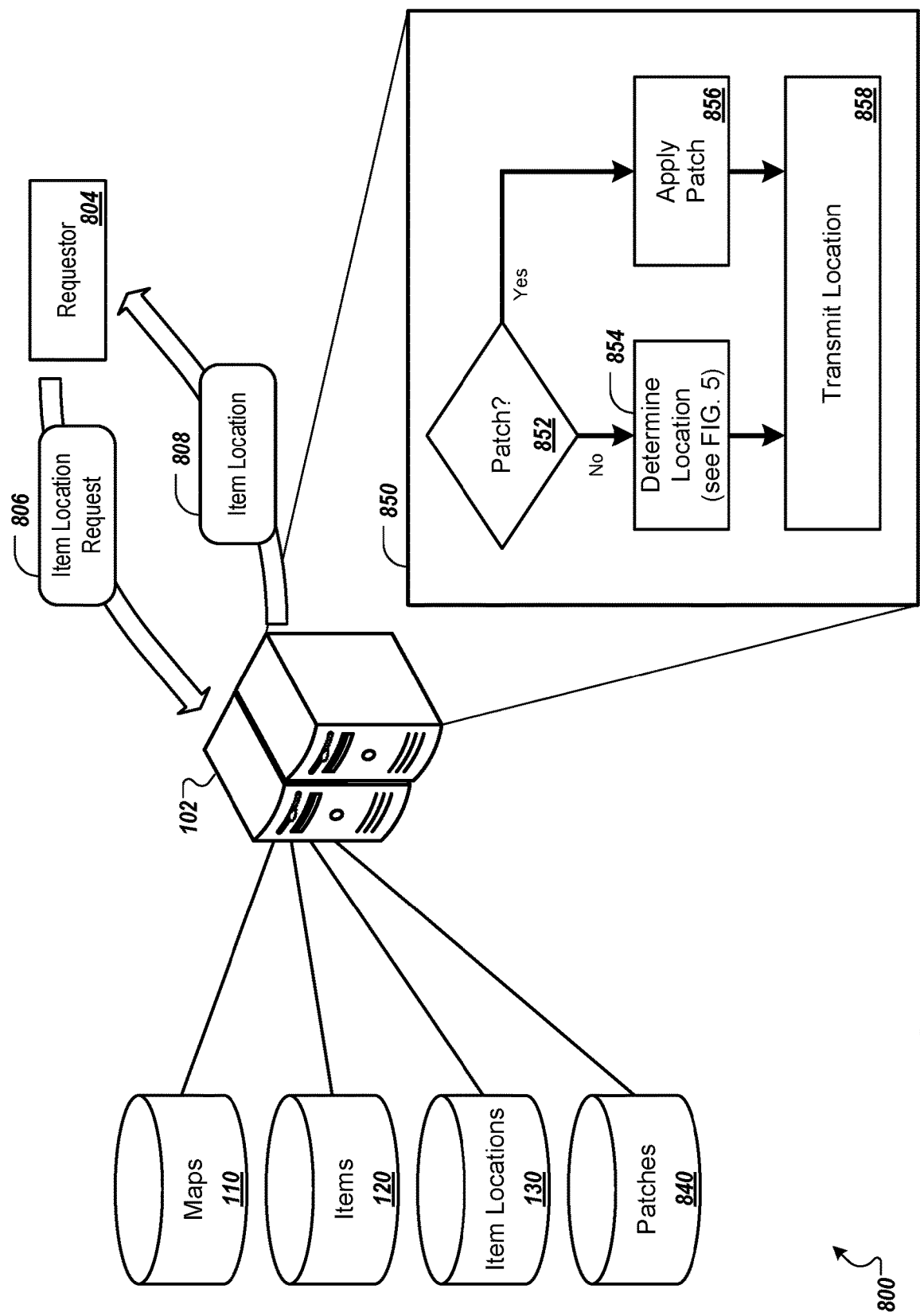
FIG. 8 is a conceptual drawing of an example system for applying patch data to a map.

At box 618, a patch may optionally be added to a map. Referring now to FIG. 8, for example, an example system 800 for applying patch data to a map is shown. In addition to the map information data source 110, the item information data source 120, and the item locations data source 130, for example, the computing servers 102 can access a map patches data source 840. The map patches data source 840, for example, can be used to store location patch data (e.g., the location patch data 732, shown in FIG. 7) that is generated from performing various work tasks (e.g., work task(s) 720). In general, updating map data stored in the map information data source 110 (e.g., modifying CAD files to reflect a current layout of a mapped space) may be a time-intensive task and/or may not be performed in a timely manner after physical layout changes are made. By storing patch data for a mapped space that corrects identified map inconsistencies, and applying the patch data when location information that pertains to a relevant portion of the map is requested, accurate location information may be provided without directly updating the map data.

At box 620, a map may optionally be corrected. For example, the computing servers 102 can provide correction information from the map patches data source 840 that facilitates correction of the map data (e.g., CAD file) for a mapped space. In some implementations, the correction information may include a report that lists and/or visually depicts various structures and areas within a mapped space for which inconsistencies have been identified, along with patch information based on employee scans that have been performed for work tasks. Map developers, for example, can refer to the correction information and make appropriate corrections such that a map properly depicts a layout of a mapped space.

Referring again to FIG. 8, for example, patch data may be selectively applied to maps in response to item location requests. For example, the computing servers 102 can receive an item location request 806 (e.g., similar to item location request 106, shown in FIGS. 1A-B) from a requestor device 804 (e.g., similar to requestor device 104, shown in FIGS. 1A-B). In response to receiving the item location request 806, for example, the computing servers 102 can perform process 850 for selectively applying patch data. However, other systems may be used to perform the same or a similar process. At box 852, a determination of whether a relevant patch exists for an item location request can be performed. For example, the item location request 806 can include an identifier of an item indicated by a user of the requestor device 804. The computing servers 102, for example, can access the map patches data source 840 and determine whether any location patch data is relevant to the item or the item's location (e.g., according to the map information data source 110, the item information data source 120, and/or the item location data source 130). If no patch is relevant, for example, at box 854, the computing servers 102 can determine the item's location according to the process 500 shown in FIG. 5. If one or more patches are relevant, for example, at box 856, the computing servers 102 can apply the patches by retrieving and providing location patch data 732 that was generated for the item in response to one or more work tasks. At box 858, an item location can be transmitted. For example, the computing servers 102 can transmit item location 808 (e.g., similar to item location 108, shown in FIG. 1) for the item to the requestor device 804.

Figure 9:
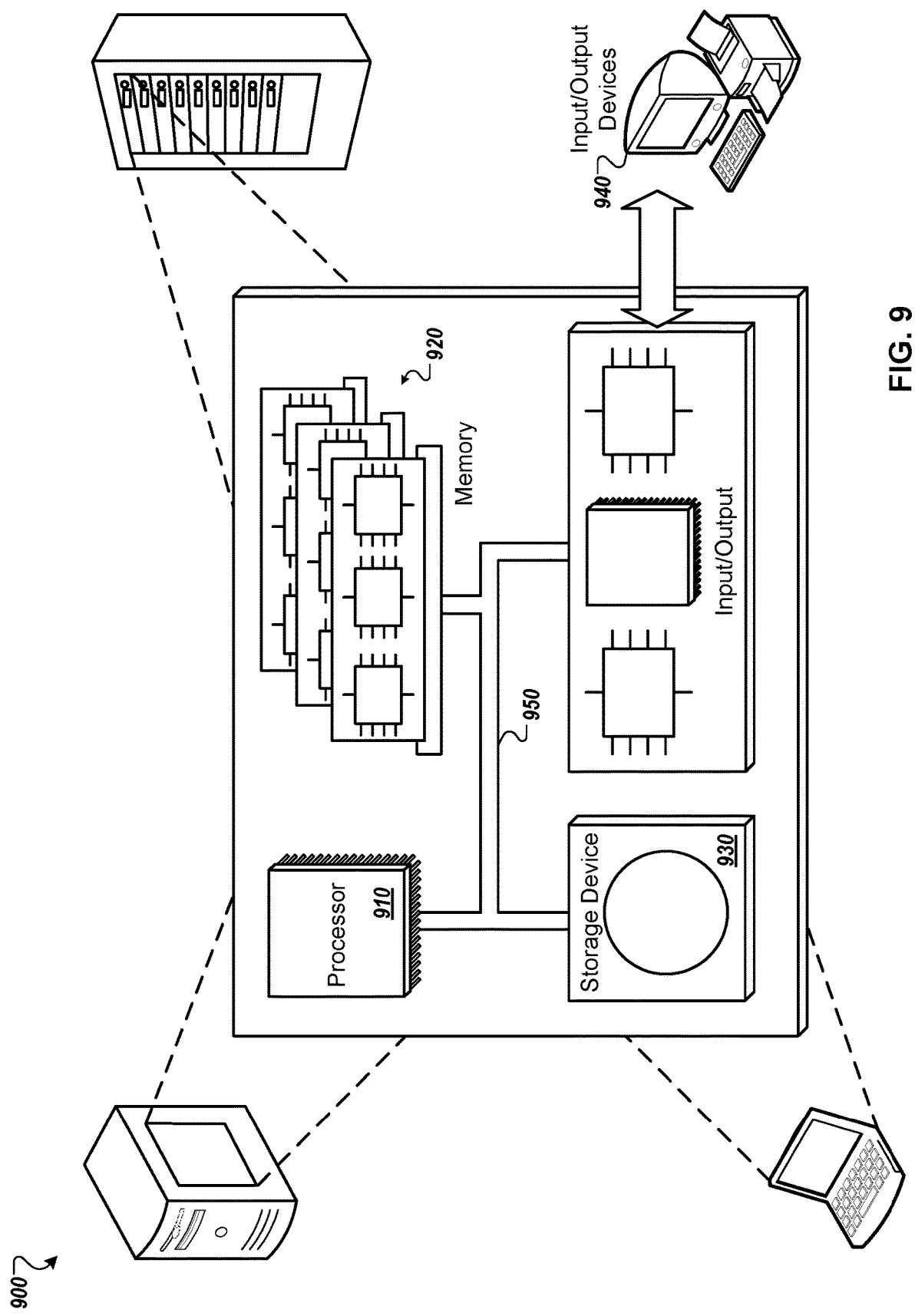
FIG. 9 is a schematic diagram that shows an example of a computing system.

FIG. 9 is a schematic diagram that shows an example of a computing system 900. The computing system 900 can be used for some or all of the operations described previously, according to some implementations. The computing system 900 includes a processor 910, a memory 920, a storage device 930, and an input/output device 940. Each of the processor 910, the memory 920, the storage device 930, and the input/output device 940 are interconnected using a system bus 950. The processor 910 is capable of processing instructions for execution within the computing system 900. In some implementations, the processor 910 is a single-threaded processor. In some implementations, the processor 910 is a multi-threaded processor. The processor 910 is capable of processing instructions stored in the memory 920 or on the storage device 930 to display graphical information for a user interface on the input/output device 940.

The memory 920 stores information within the computing system 900. In some implementations, the memory 920 is a computer-readable medium. In some implementations, the memory 920 is a volatile memory unit. In some implementations, the memory 920 is a non-volatile memory unit.

The storage device 930 is capable of providing mass storage for the computing system 900. In some implementations, the storage device 930 is a computer-readable medium. In various different implementations, the storage device 930 may be a floppy disk device, a hard disk device, an optical disk device, or a tape device.

The input/output device 940 provides input/output operations for the computing system 900. In some implementations, the input/output device 940 includes a keyboard and/or pointing device. In some implementations, the input/output device 940 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A computer-implemented method comprising:
   receiving, from a requestor device, an item location request for an item;
   receiving map information for a mapped space of a retail environment in which the item is located;
   receiving item location coordinates corresponding to locations within the mapped space at which the item has been previously selected or scanned using various different data collection devices over time;
   mapping, by one or more processors, the item location coordinates with respect to the mapped space;
   determining, by one or more processors, a plurality of clusters for the item location coordinates, based on the mapping, wherein determining the plurality of clusters includes using a machine learning algorithm to group data points representing the item location coordinates with respect to the mapped space into the plurality of clusters, wherein the machine learning algorithm groups the data points into at least three clusters;
   determining, by one or more processors and for each cluster of the plurality of clusters, a representative location of the cluster, based on the data points of the cluster;
   determining, by one or more processors, a selected cluster, by eliminating two or more of the clusters from the plurality of clusters and selecting from one or more remaining clusters, wherein eliminating two or more of the clusters includes:
   (i) comparing a number of data points in each cluster of the plurality of clusters, and eliminating, from the plurality of clusters, at least one cluster that includes fewer data points relative to other clusters, and
   (ii) eliminating, from the plurality of clusters, at least one cluster that has a representative location that is within a predefined area of the mapped space of the retail environment that is designated as a check-out register area and that is designated as excluding an assigned location of the item according to item planogram information for the item, wherein the item planogram information indicates one or more assigned locations for the item within the mapped space; and
   providing, to the requestor device, an estimated location of the item, based at least in part on the representative location of the selected cluster.

2. The computer-implemented method of claim 1, wherein the item location request includes location information that corresponds to a current location of the requestor device, and wherein map information is received for the mapped space that corresponds to the current location.

3. The computer-implemented method of claim 1, wherein the requestor device presents an item selection interface for indicating the item for which location information is to be provided.

4. The computer-implemented method of claim 1, wherein the requestor device presents a feedback interface for providing feedback with respect to whether the estimated location of the item is an accurate location of the item within the mapped space.

5. The computer-implemented method of claim 1, further comprising:
   receiving, by one or more computing servers, item information for the item, the item information including the item planogram information for the item, and including item taxonomy information that indicates a classification of the item within a classification hierarchy.

6. The computer-implemented method of claim 5, further comprising:
   determining, by one or more computing servers, that a number of item location coordinates does not meet a threshold value, and
   receiving supplemental item location coordinates corresponding to locations within the mapped space at which items that share one or more classification levels with the item have been previously selected or scanned.

7. The computer-implemented method of claim 5, further comprising:
   selecting the estimated location of the item, including selecting from among the representative location of the selected cluster and the one or more assigned locations for the item within the mapped space.

8. The computer-implemented method of claim 5, wherein determining the selected cluster includes selecting a cluster that has a representative location that is located within an area that corresponds to one of the assigned locations for the item within the mapped space, based on its item planogram information.

9. The computer-implemented method of claim 1, further comprising:
   maintaining in a cache item information that includes the representative location of the selected cluster;
   receiving, from a second requestor device, a subsequent location request for the item;
   providing, to the second requestor device, the estimated location of the item, based at least in part on the cached item information that includes the representative location of the selected cluster;
   receiving, from a data collection device, new item location coordinates for the item within the mapped space; and
   in response to receiving the new item location coordinates, removing the item information for the item from the cache.

10. The computer-implemented method of claim 1, further comprising:
    determining, by one or more processors, that the estimated location of the item is inconsistent with the map information and with the item planogram information, including:
    (i) identifying a fixture for the item according to the item planogram information,
    (ii) identifying location coordinates for the fixture according to the map information, and
    (iii) determining that the location coordinates for the fixture according to the map information are not within a threshold distance of the estimated location of the item.

11. The computer-implemented method of claim 10, further comprising:
    in response to determining that the estimated location of the item is inconsistent with the map information and with the item planogram information:

generating instructions to perform a work task, including (i) moving to the item in the mapped space, and (ii) when located near the item in the mapped space, selecting or scanning the item; and providing the instructions to perform the work task to a data collection device.

12. The computer-implemented method of claim 11, further comprising:

receiving, from the data collection device, selection or scan data that corresponds to a selection or scan of the item, the selection or scan data including reliable item location coordinates for the item; and providing, to the requestor device, the reliable item location coordinates for the item.

13. A computer system comprising:

a data processing apparatus including one or more processors, memory, and storage devices storing instructions that, when executed, cause the one or more processors to perform operations comprising:

receiving, from a requestor device, an item location request for an item;

receiving map information for a mapped space of a retail environment in which the item is located;

receiving item location coordinates corresponding to locations within the mapped space at which the item has been previously selected or scanned using various different data collection devices over time;

mapping, by one or more processors, the item location coordinates with respect to the mapped space;

determining, by one or more processors, a plurality of clusters for the item location coordinates, based on the mapping, wherein determining the plurality of clusters includes using a machine learning algorithm to group data points representing the item location coordinates with respect to the mapped space into the plurality of clusters, wherein the machine learning algorithm groups the data points into at least three clusters;

determining, by one or more processors and for each cluster of the plurality of clusters, a representative location of the cluster, based on the data points of the cluster;

determining, by one or more processors, a selected cluster, by eliminating two or more of the clusters from the plurality of clusters and selecting from one or more remaining clusters, wherein eliminating two or more of the clusters includes:

(i) comparing a number of data points in each cluster of the plurality of clusters, and eliminating, from the plurality of clusters, at least one cluster that includes fewer data points relative to other clusters, and (ii) eliminating, from the plurality of clusters, at least one cluster that has a representative location that is within a predefined area of the mapped space of the retail environment that is designated as a check-out register area and that is designated as excluding an assigned location of the item according to item planogram information for the item, wherein the item planogram information indicates one or more assigned locations for the item within the mapped space; and providing, to the requestor device, an estimated location of the item, based at least in part on the representative location of the selected cluster.

14. The computer system of claim 13, wherein the item location request includes location information that corresponds to a current location of the requestor device, and wherein map information is received for the mapped space that corresponds to the current location.

15. The computer system of claim 13, wherein the requestor device presents an item selection interface for indicating the item for which location information is to be provided.

16. The computer system of claim 13, wherein the requestor device presents a feedback interface for providing feedback with respect to whether the estimated location of the item is an accurate location of the item within the mapped space.

17. The computer system of claim 13, the operations further comprising:

receiving, by one or more computing servers, item information for the item, the item information including the item planogram information for the item, and including item taxonomy information that indicates a classification of the item within a classification hierarchy.

18. The computer system of claim 17, the operations further comprising:

determining, by one or more computing servers, that a number of item location coordinates does not meet a threshold value, and receiving supplemental item location coordinates corresponding to locations within the mapped space at which items that share one or more classification levels with the item have been previously selected or scanned.

19. The computer system of claim 17, the operations further comprising:

selecting the estimated location of the item, including selecting from among the representative location of the selected cluster and the one or more assigned locations for the item within the mapped space.

20. The computer system of claim 17, wherein determining the selected cluster includes selecting a cluster that has a representative location that is located within an area that corresponds to one of the assigned locations for the item within the mapped space, based on its item planogram information.

21. The computer system of claim 13, the operations further comprising:

maintaining in a cache item information that includes the representative location of the selected cluster;

receiving, from a second requestor device, a subsequent location request for the item;

providing, to the second requestor device, the estimated location of the item, based at least in part on the cached item information that includes the representative location of the selected cluster;

receiving, from a data collection device, new item location coordinates for the item within the mapped space; and in response to receiving the new item location coordinates, removing the item information for the item from the cache.

22. The computer system of claim 13, further comprising:

determining, by one or more processors, that the estimated location of the item is inconsistent with the map information and with the item planogram information, including:

(i) identifying a fixture for the item according to the item planogram information, (ii) identifying location coordinates for the fixture according to the map information, and (iii) determining that the location coordinates for the fixture according to the map information are not within a threshold distance of the estimated location of the item.

23. The computer system of claim 22, further comprising:
in response to determining that the estimated location of the item is inconsistent with the map information and with the item planogram information:
  generating instructions to perform a work task, including (i) moving to the item in the mapped space, and (ii) when located near the item in the mapped space, selecting or scanning the item; and
  providing the instructions to perform the work task to a data collection device.

24. The computer system of claim 23, further comprising:
receiving, from the data collection device, selection or scan data that corresponds to a selection or scan of the item, the selection or scan data including reliable item location coordinates for the item; and
providing, to the requestor device, the reliable item location coordinates for the item.

\* \* \* \* \*